Dec. 5, 1939.  W. F. SCHULZ  2,182,739
AUTOMATIC PHONOGRAPH
Filed Nov. 29, 1938  20 Sheets-Sheet 1

INVENTOR
Walter F. Schulz.
BY Everett G. Wright
ATTORNEY

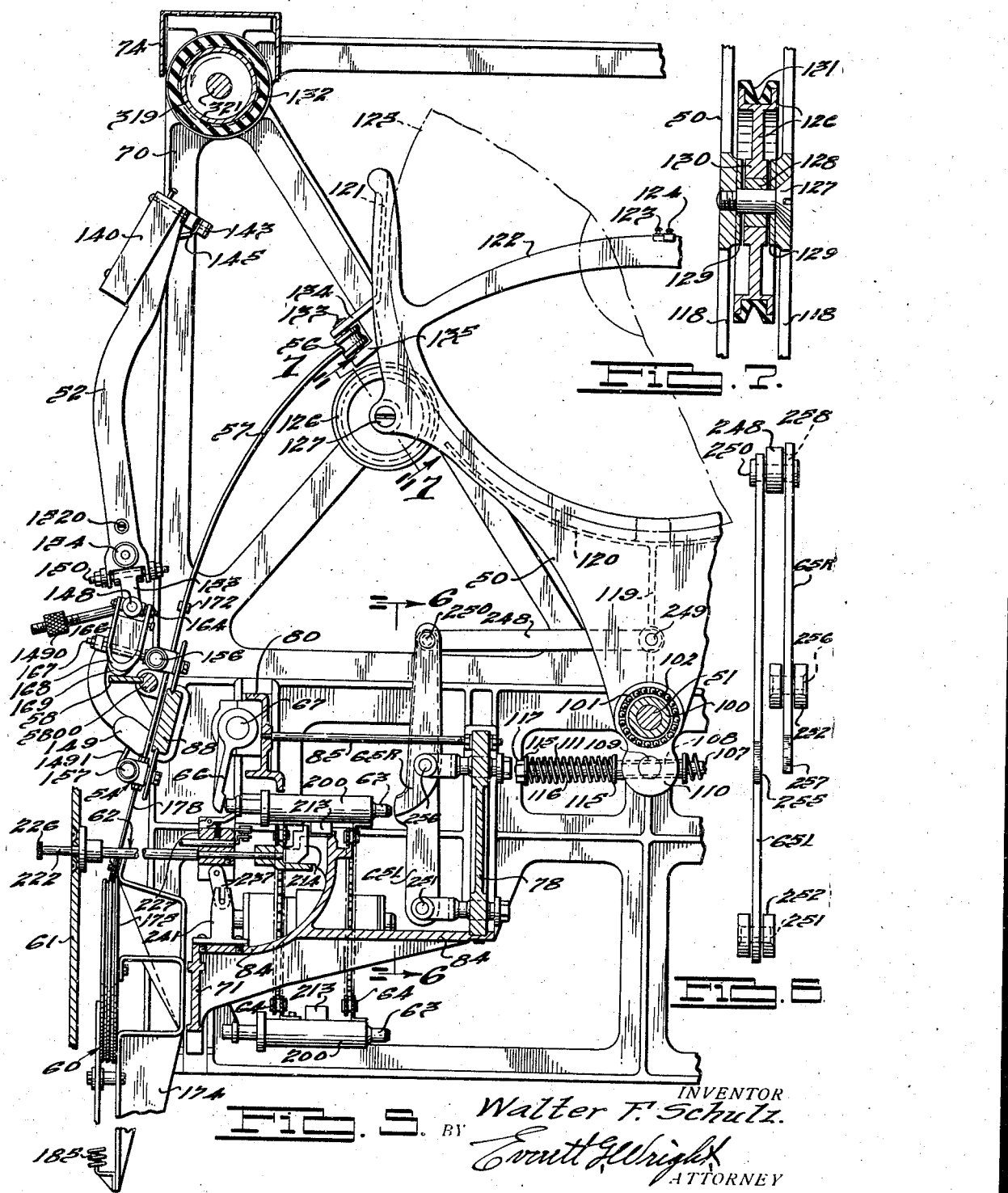

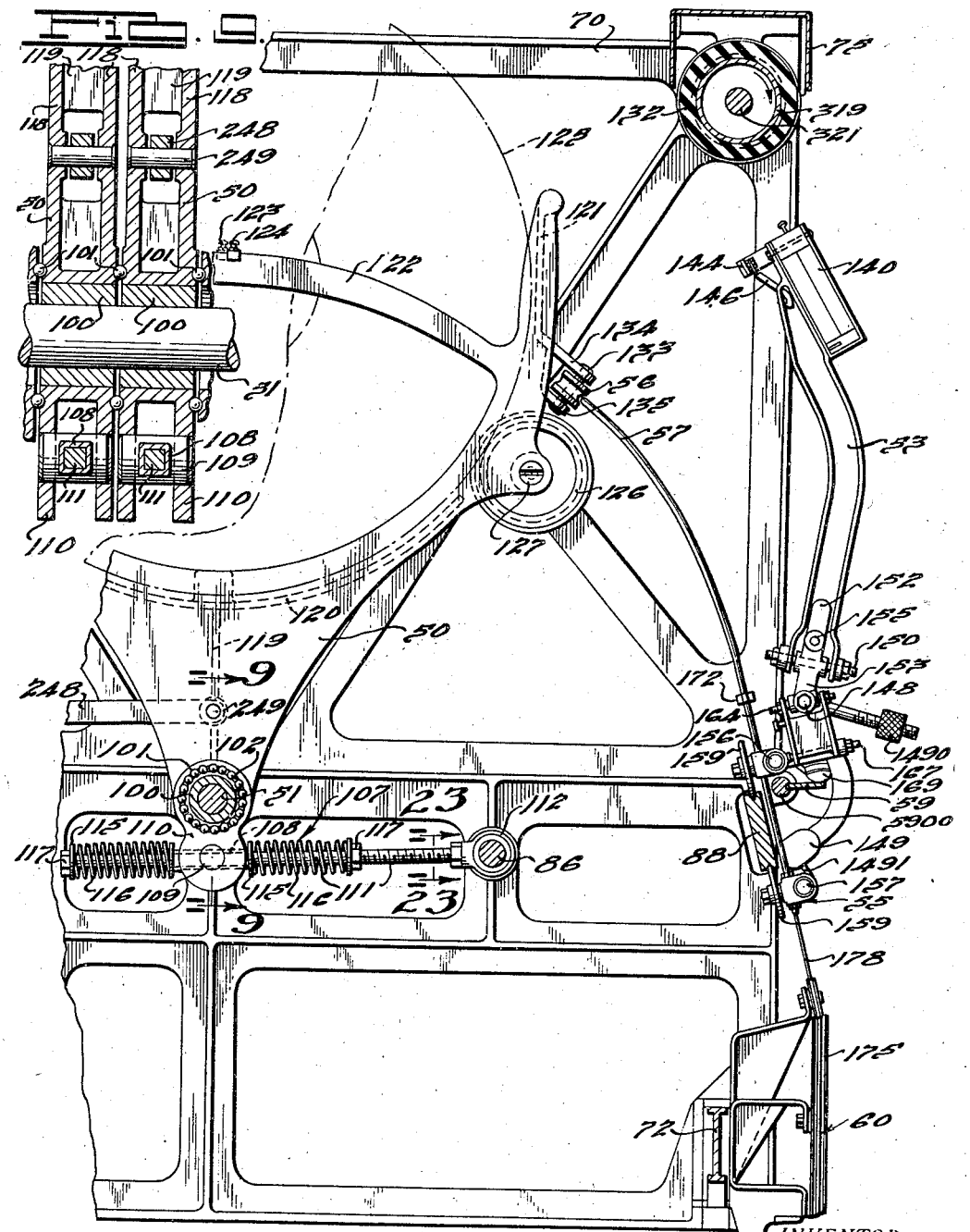

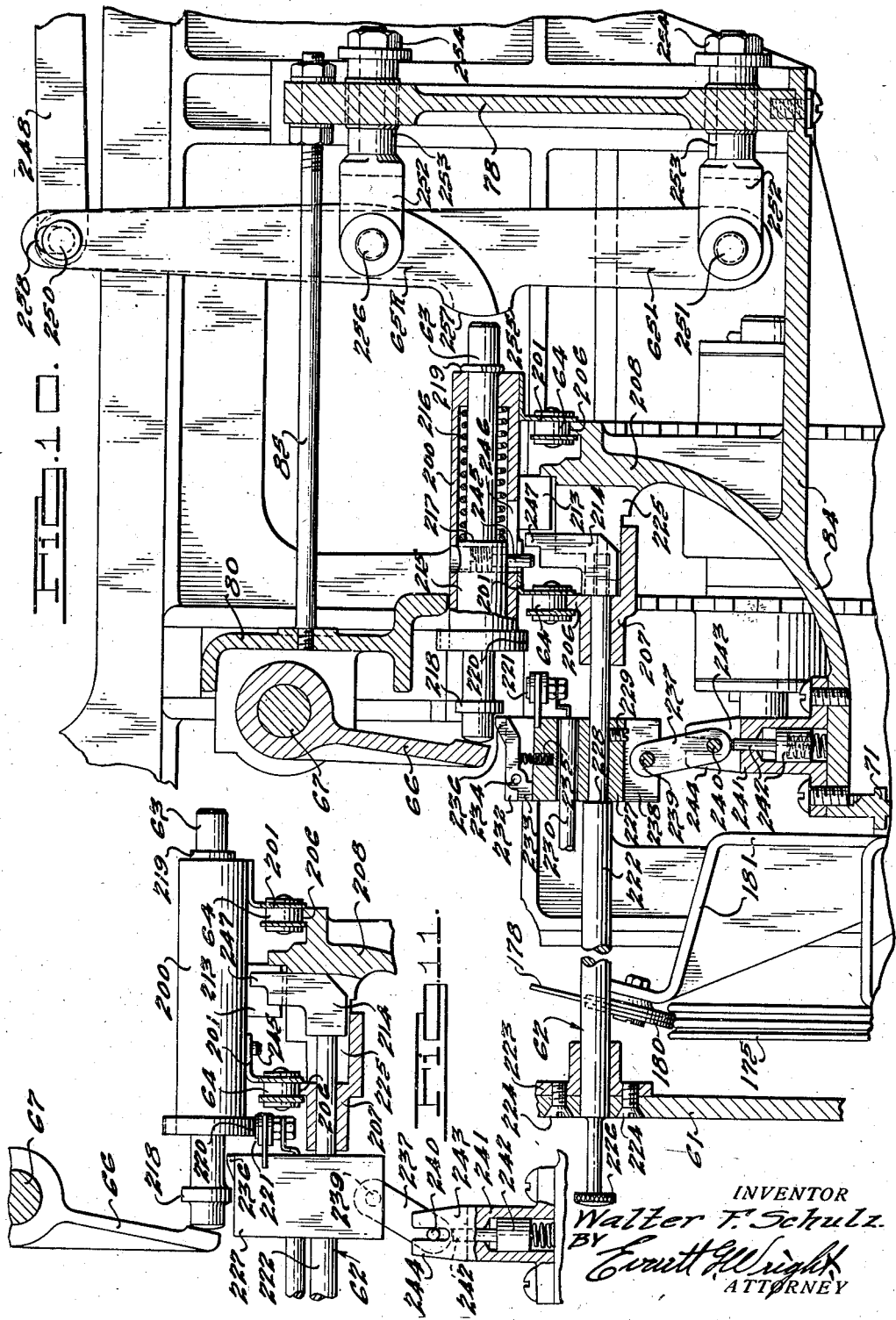

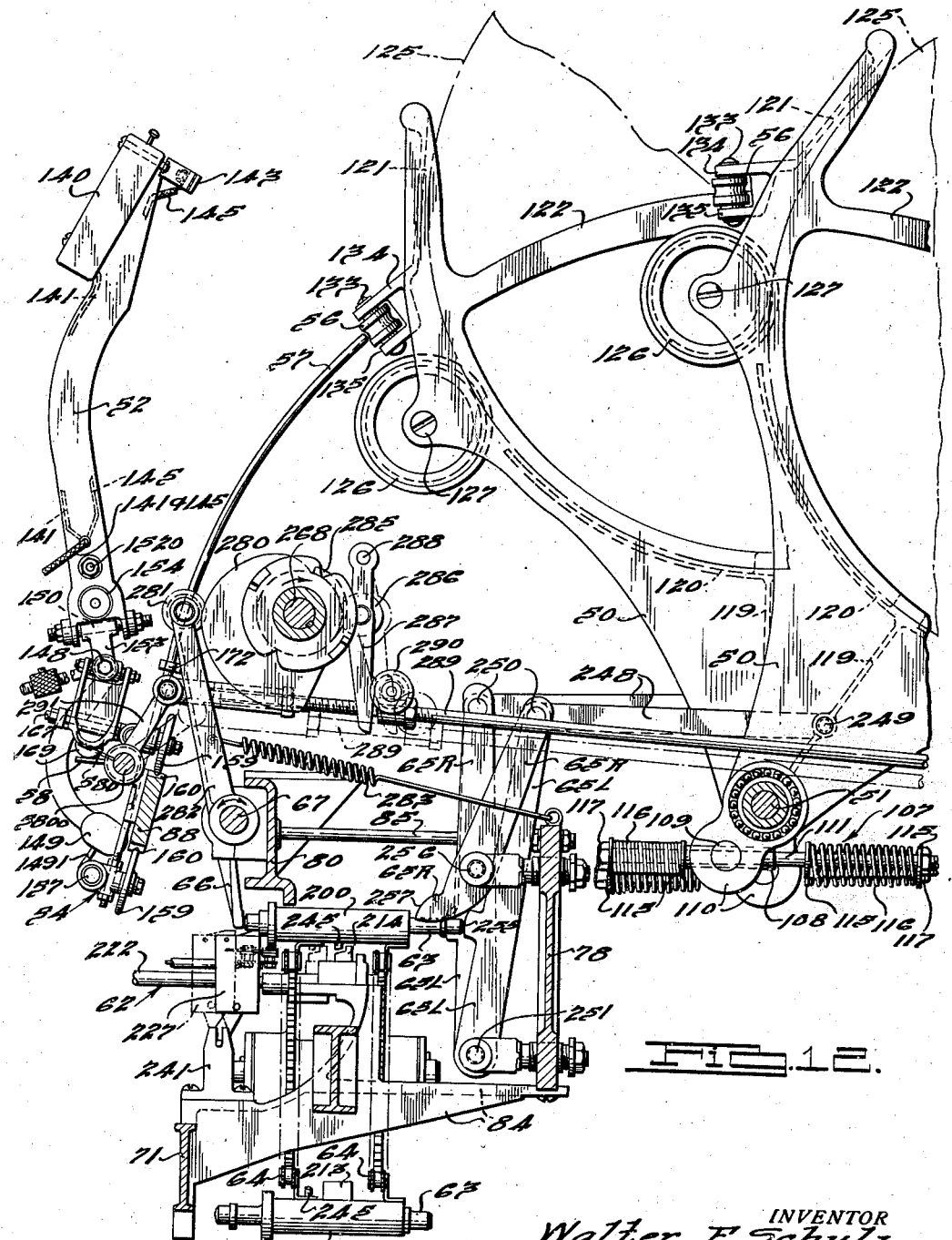

Dec. 5, 1939.   W. F. SCHULZ   2,182,739
AUTOMATIC PHONOGRAPH
Filed Nov. 29, 1938   20 Sheets-Sheet 9

INVENTOR
Walter F. Schulz.
BY
ATTORNEY

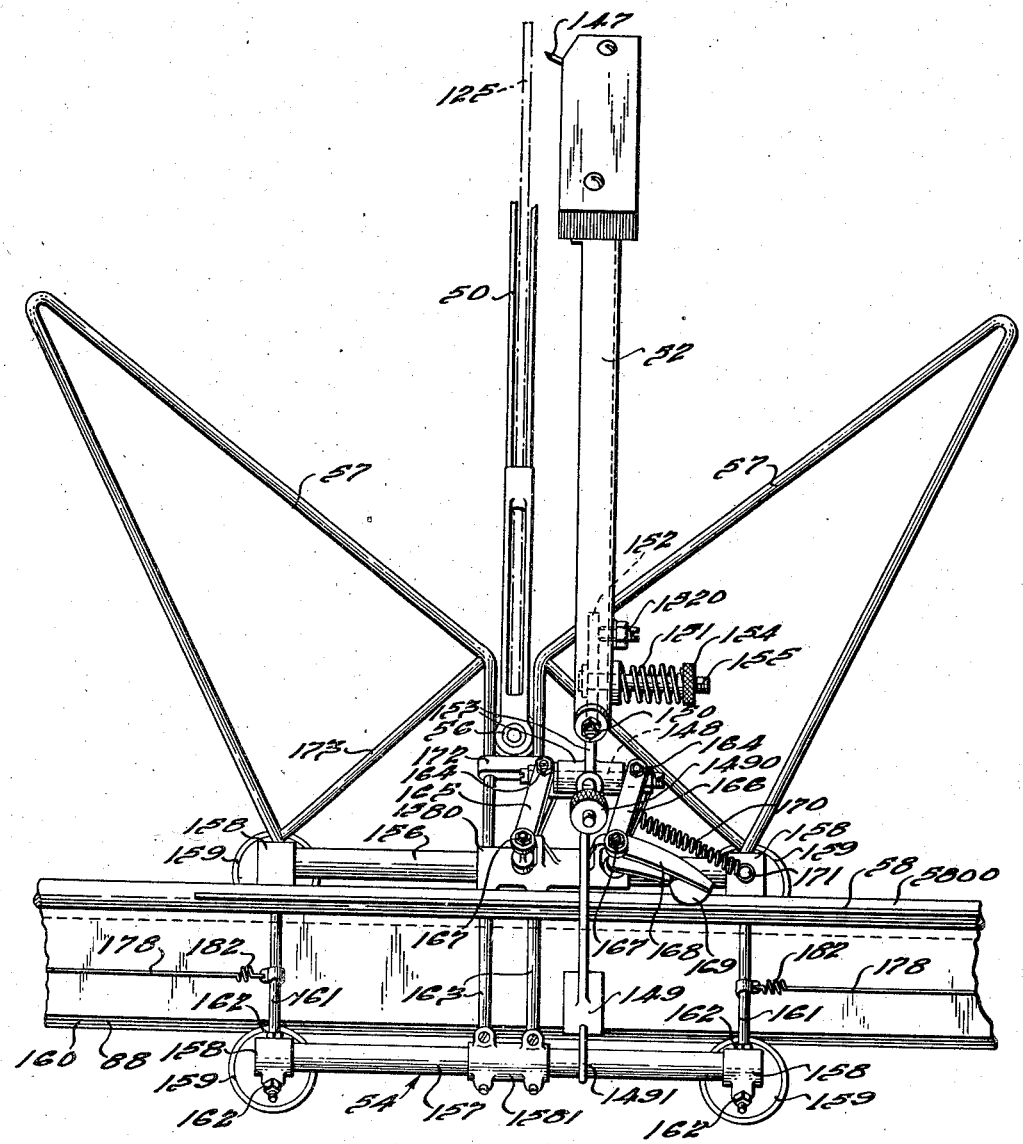

Dec. 5, 1939.   W. F. SCHULZ   2,182,739
AUTOMATIC PHONOGRAPH
Filed Nov. 29, 1938   20 Sheets-Sheet 11
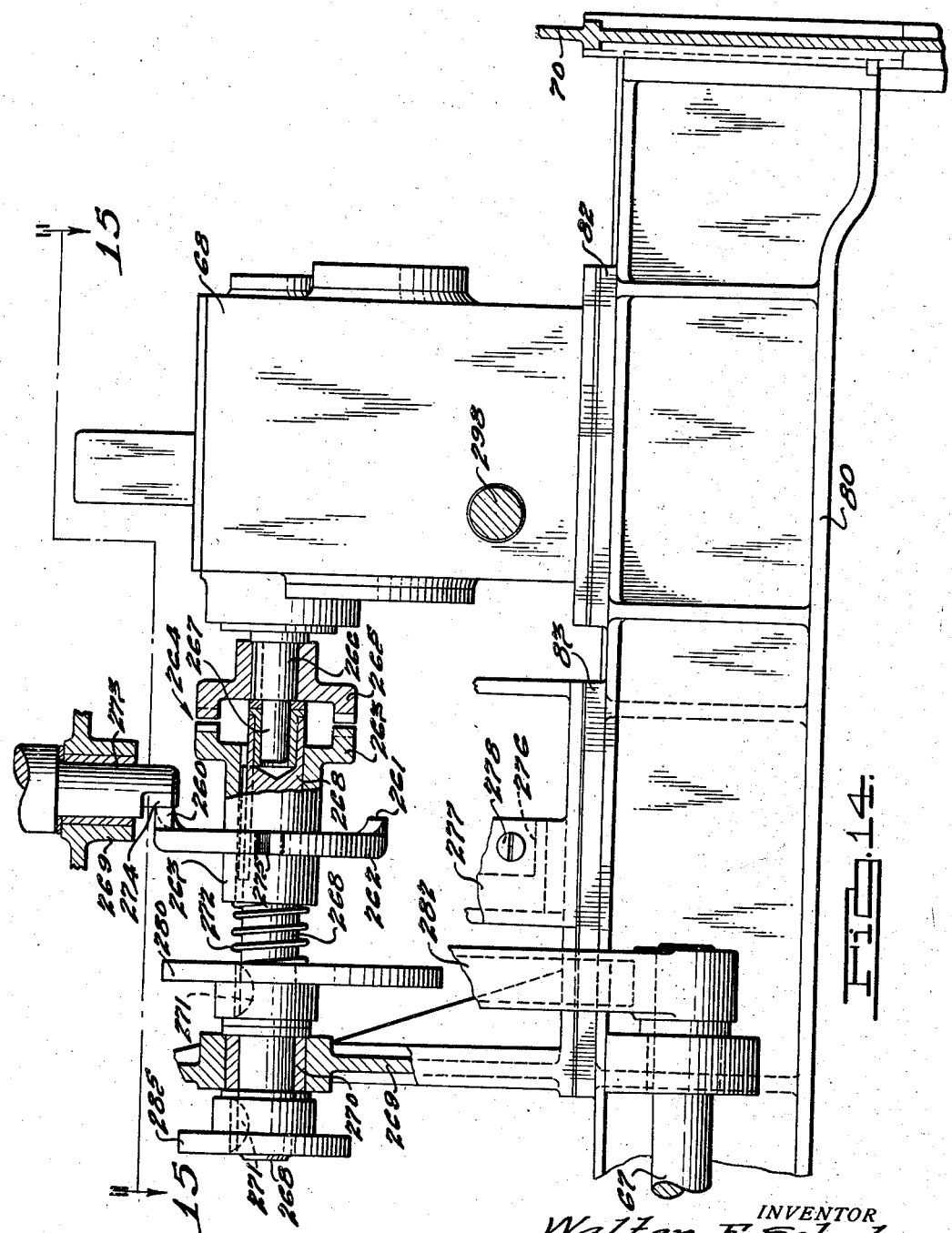
INVENTOR
Walter F. Schulz.
BY Everett E. Wright
ATTORNEY

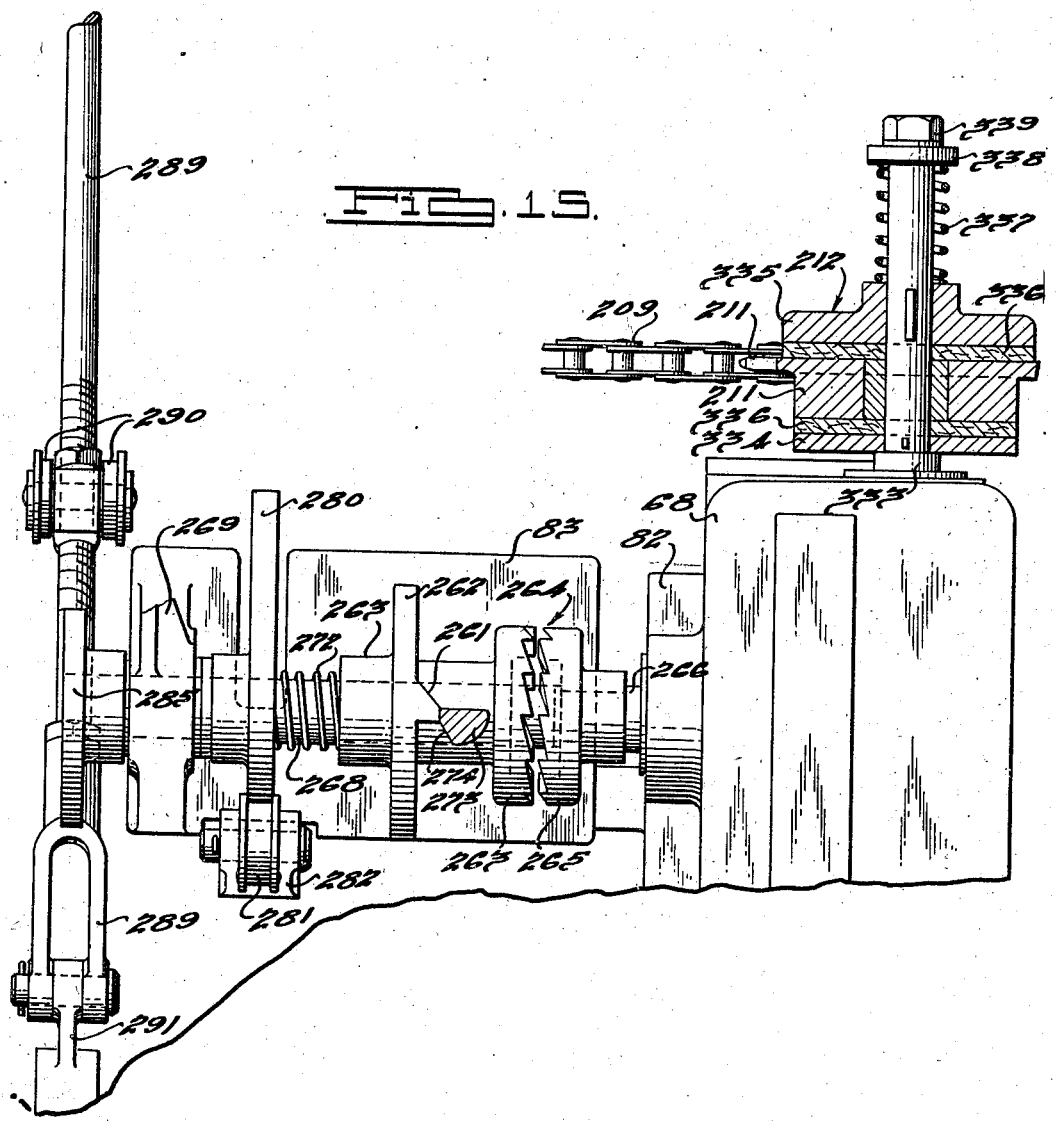

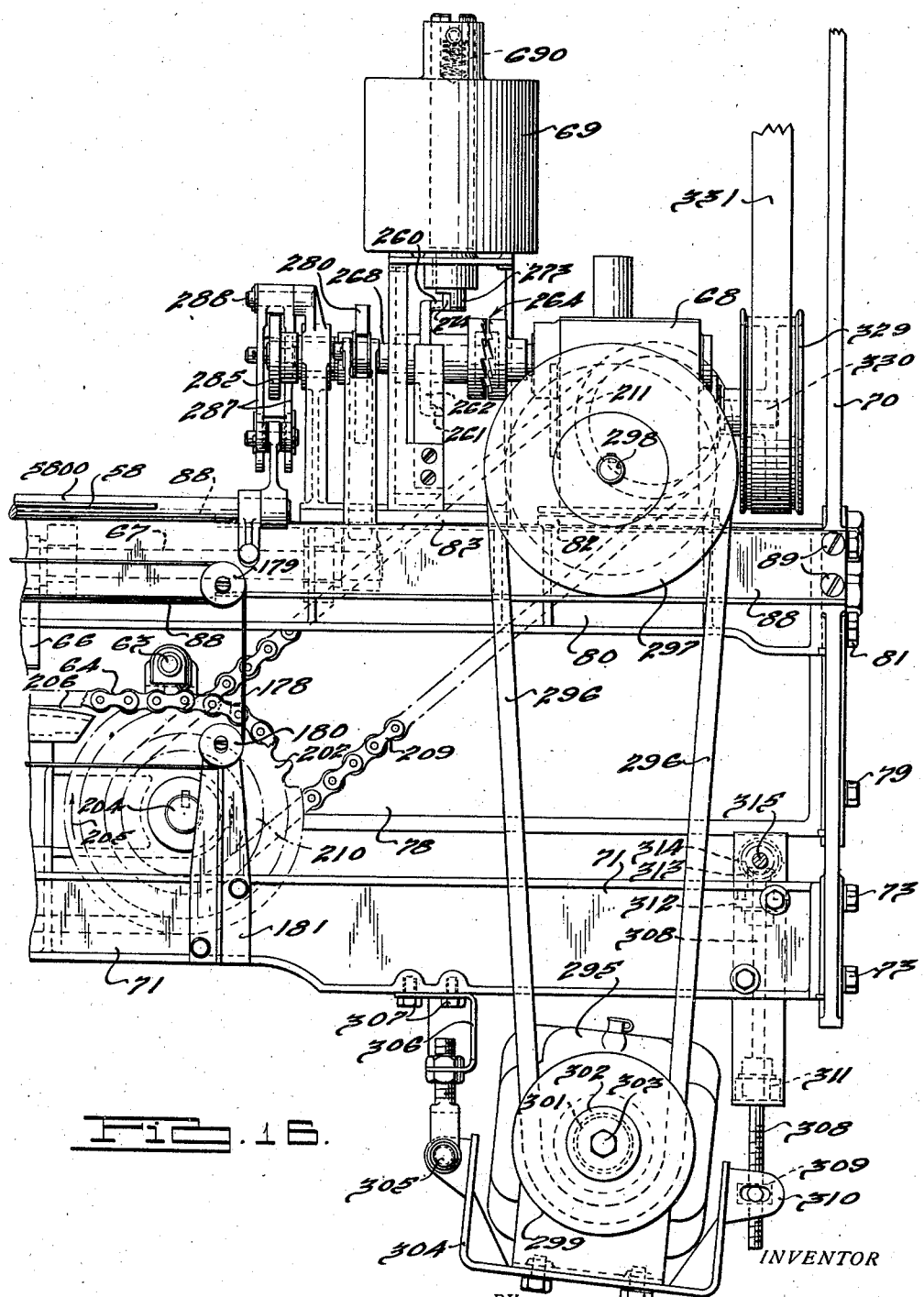

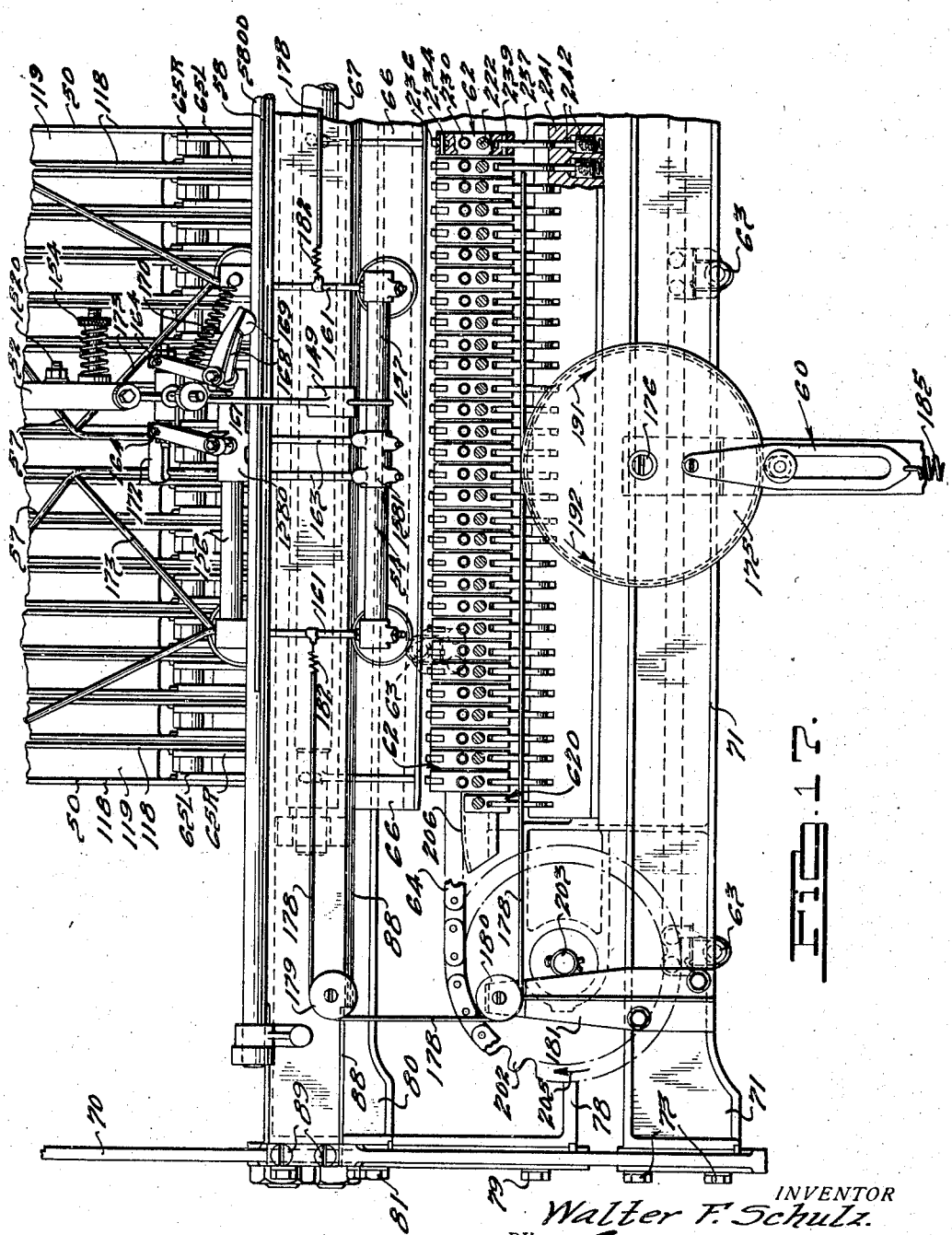

Dec. 5, 1939.  W. F. SCHULZ  2,182,739
AUTOMATIC PHONOGRAPH
Filed Nov. 29, 1938  20 Sheets-Sheet 15
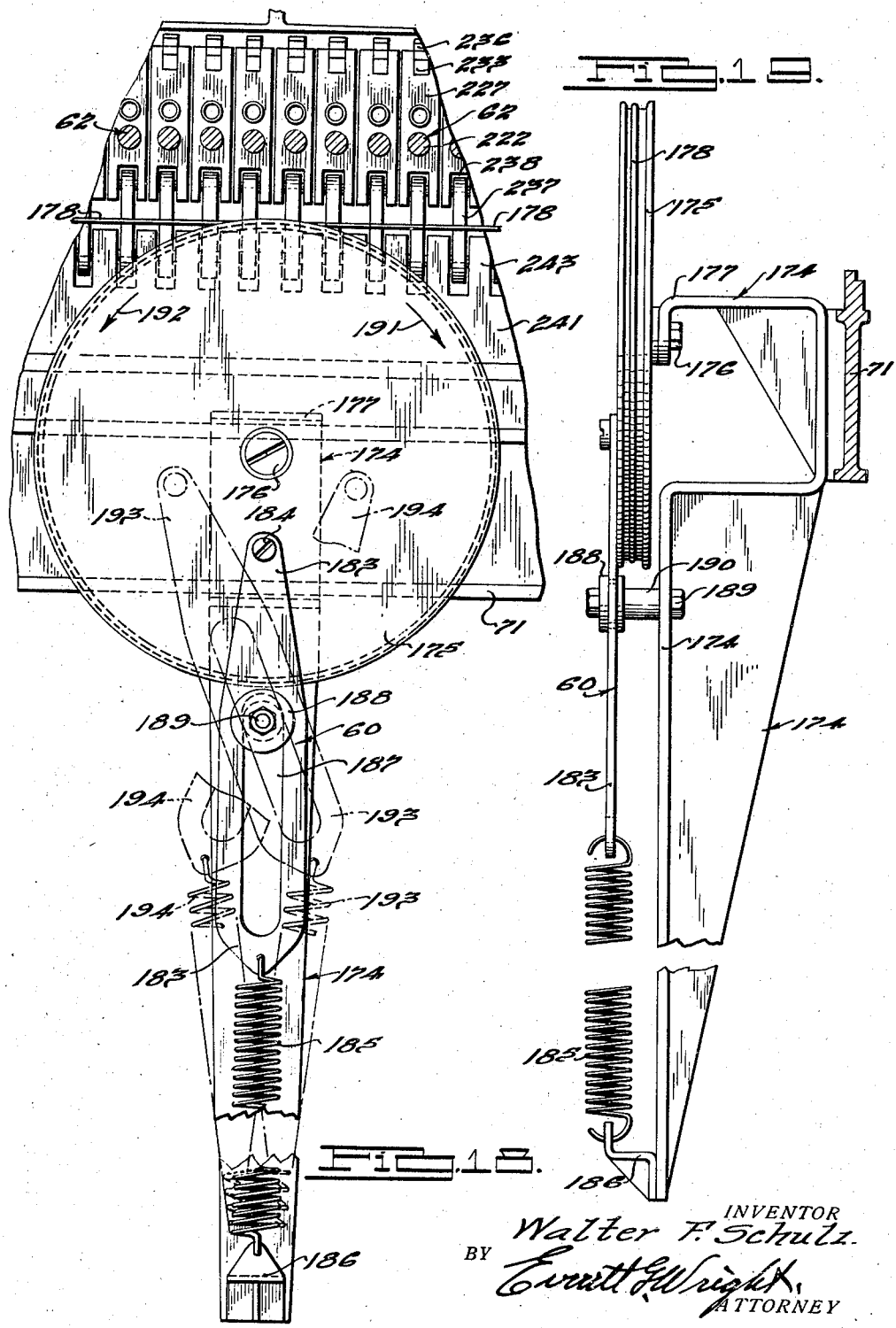
INVENTOR
Walter F. Schulz.
BY Everett G. Wright,
ATTORNEY

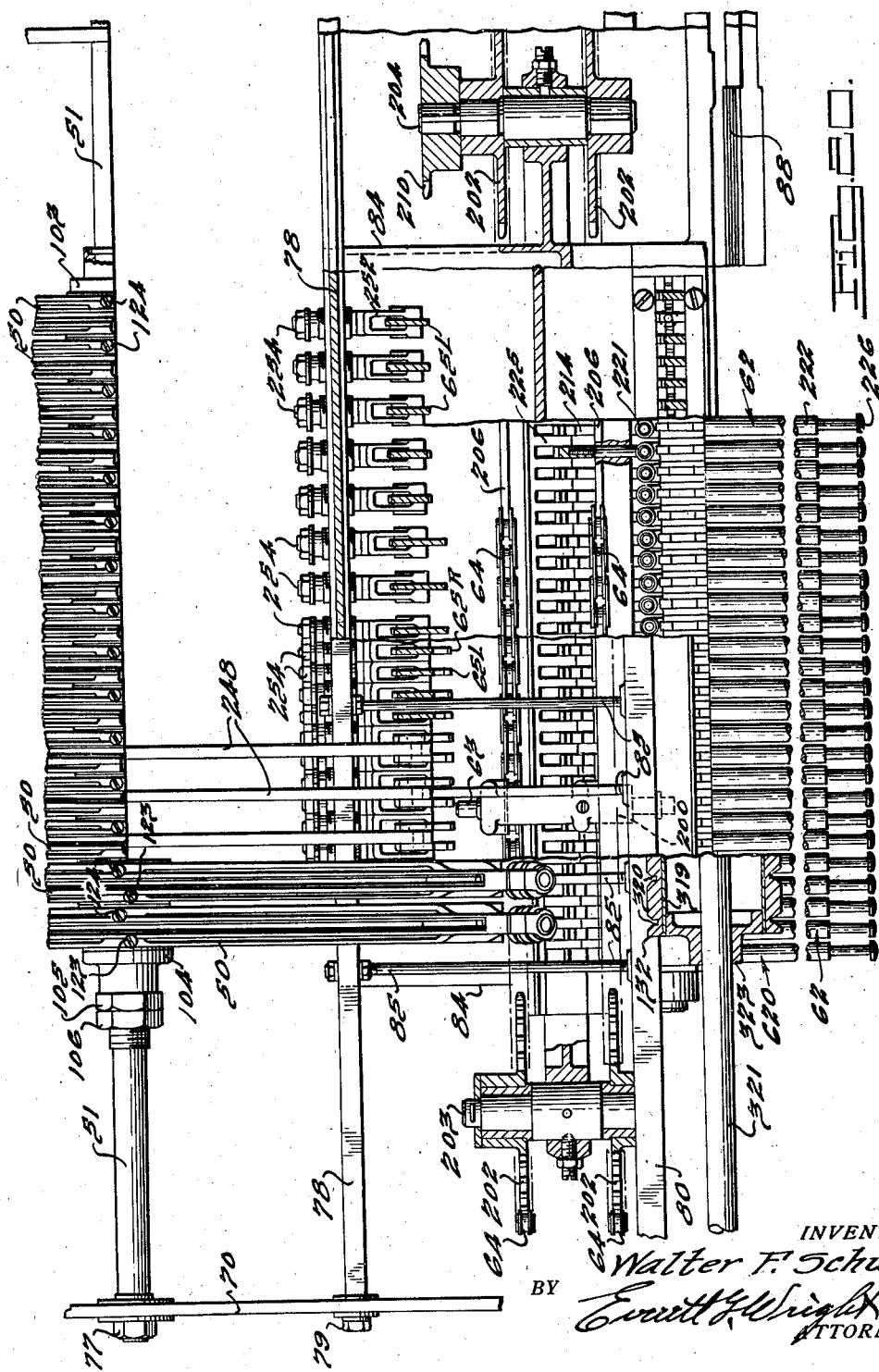

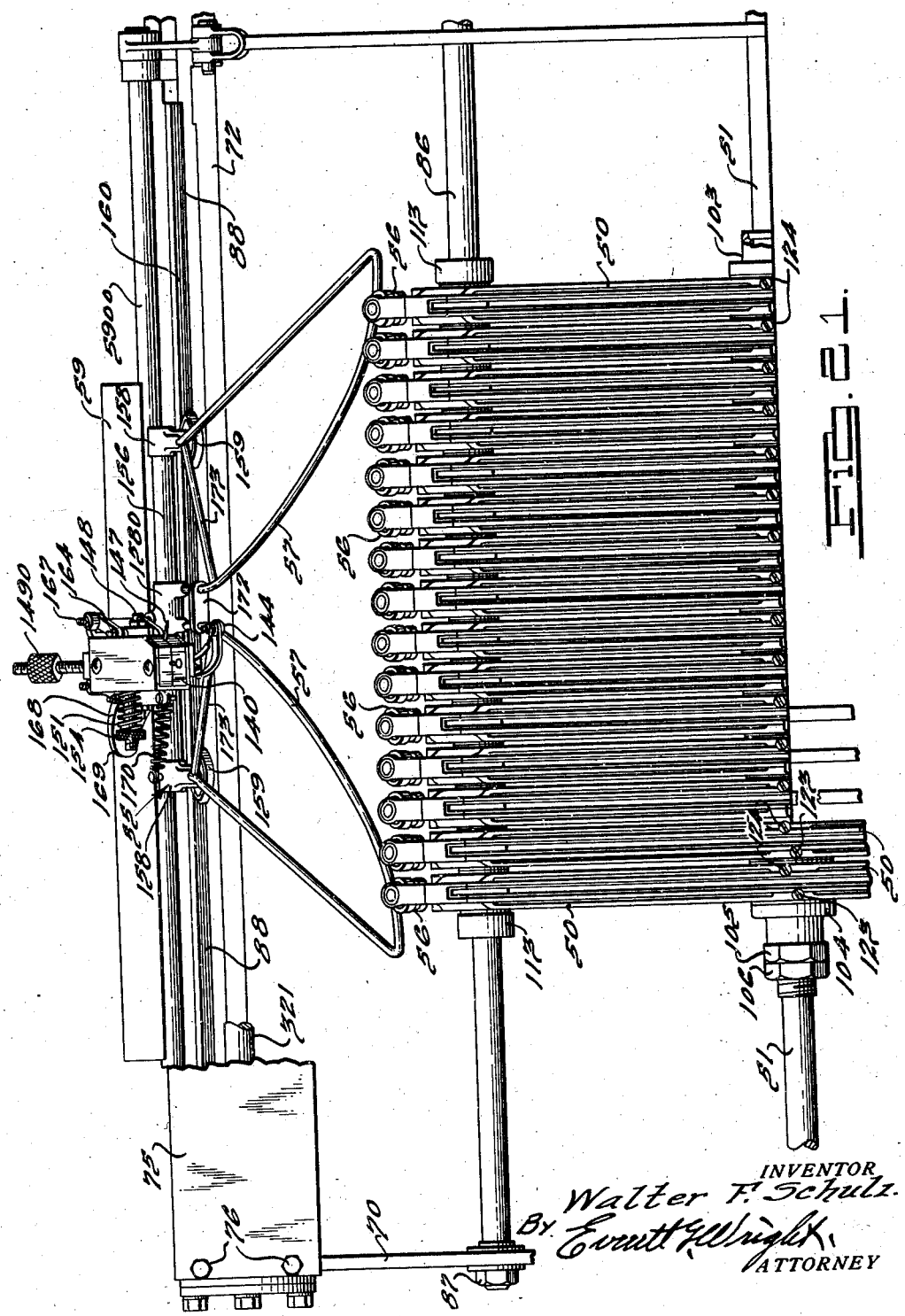

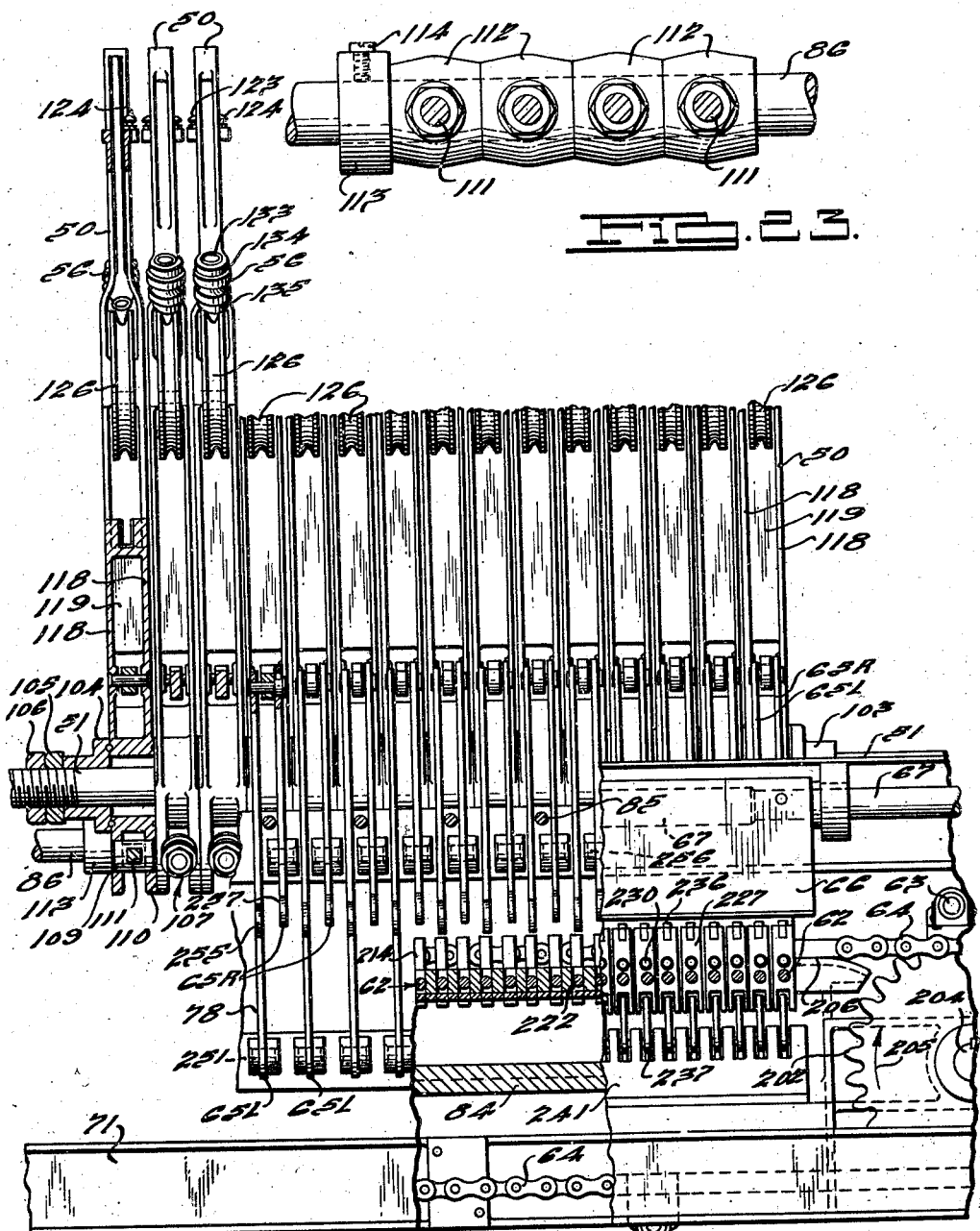

Dec. 5, 1939.    W. F. SCHULZ    2,182,739
AUTOMATIC PHONOGRAPH
Filed Nov. 29, 1938    20 Sheets-Sheet 19

INVENTOR
Walter F. Schulz.
BY
ATTORNEY

Dec. 5, 1939.  W. F. SCHULZ  2,182,739
AUTOMATIC PHONOGRAPH
Filed Nov. 29, 1938  20 Sheets-Sheet 20
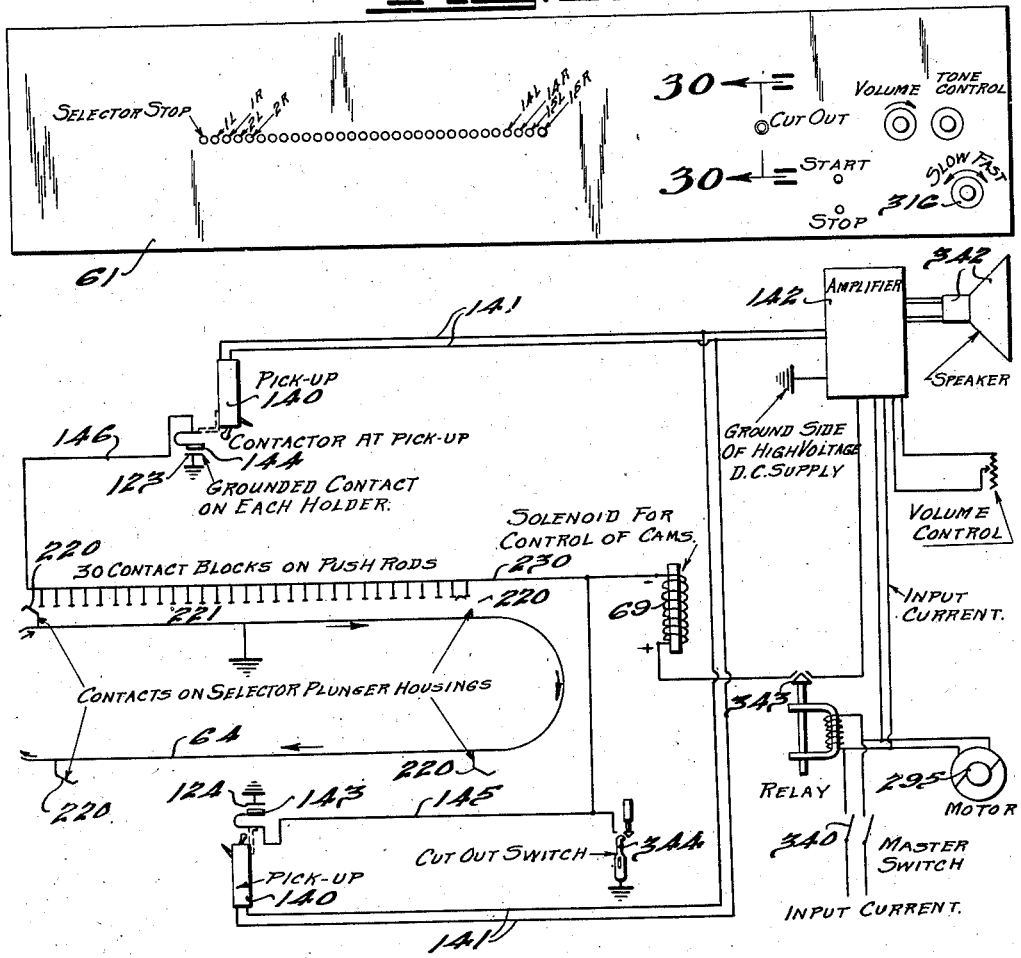
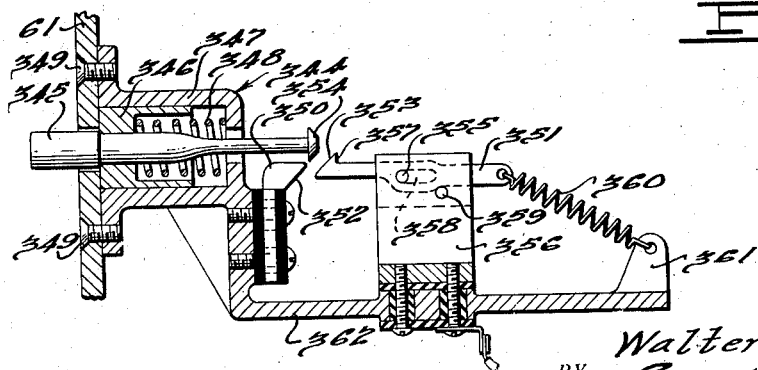
INVENTOR
Walter F. Schulz.
BY
ATTORNEY Patented Dec. 5, 1939

2,182,739

UNITED STATES PATENT OFFICE 2,182,739

AUTOMATIC PHONOGRAPH

Walter F. Schulz, Shaker Heights, Ohio, assignor of one-half to Julius Kahn, Cleveland, Ohio Application November 29, 1938, Serial No. 242,950

53 Claims. (Cl. 274—10)

This invention relates to automatic phonographs and in particular to automatic phonographs of the type which plays any record or any series of records that may be selected from a plurality of records placed in the machine.

Heretofore automatic phonographs have been undesirable because of their limited record capacity and selectivity and because of the fact that when double faced records are used much time is required to turn the records over which causes an unreasonably long pause between the completion of playing of one side of a record or group of records and the beginning of the playing of the reverse side thereof. It is possible, of course, to use single faced records to take the place of double faced records to avoid the necessity of turning the double faced records. However, the use of single faced records becomes cumbersome, limits the capacity of the machine and adds unnecessary expense and record storage space to the user's music library.

The record selecting mechanisms in the prior art are generally slow in operation and lack the necessary flexibility to give the automatic phonograph owner or operator a complete range of selection of either or both sides of a single record and the selection of any of a series of records or sides thereof which have been loaded into a machine. In prior art machines it is generally necessary to unload and re-load records to be played after a phonograph has been loaded to omit one or more of the records from a group of records placed in the machine for playing.

With the foregoing in view and broadly stated, one object of the invention is to provide an automatic phonograph having complete flexibility of selection and playing either or both sides of a record or either or both sides of any series of records from a plurality of records loaded in the record magazine of the machine.

Another object of the invention is to provide an automatic phonograph in which the elapsed time between the completion of play of one record and the beginning of the playing of another selected record is but a few seconds whereby to eliminate long pauses between the various parts of a program selected from records loaded in the magazine of the machine.

Another object of the invention is to provide a phonograph which will automatically play responsive to the pre-selection by its operator any desired program from one or both sides of any one or more of a plurality of records with which the record magazine of the phonograph has been loaded.

Another object of the invention is to provide an automatic phonograph having means for bringing either side of any one or more records loaded in the record magazine thereof into and out of play rapidly and substantially without impact by novel, rugged, inexpensive to manufacture mechanism which is readily accessible and easy to service.

Among the novel features of the invention is the record magazine composed of a plurality of tiltable record holders and the means for centering the record holders in their neutral vertical position.

Another feature of the invention relates to the novel means employed for selecting and moving any record holder into a playing position so that the selected side of the record carried thereby is played by one of two like but oppositely disposed tone arms.

Another feature of the invention is the novel tone arm carriages employed and the movement of one or the other of the tone arm carriages into playing position with respect to the selected side of any record responsive to the tilting of any record holder.

Another feature relates to the timed means and mechanism for placing and maintaining one of two tone arms in playing position with respect to the selected side of any selected record with the needle of one of the tone arms firmly but resiliently urged under controlled pressure in registry with the sound groove of the said record.

Another feature relates to the mounting of the tone arms so as to cause the needles carried thereby to travel in a path substantially tangential with respect to the sound grooves of a record during the playing of the same.

Another feature of the invention is the employment of novel tone arm carriage centering devices which automatically maintain the tone arm carriages in a neutral central position with respect to the record magazine except during the playing of any selection.

Another feature of the invention is the record selector mechanism employed which enables the operator of the machine to preselect for playing any or both sides of any one or a series of records from the record magazine.

Another feature of the invention is the use of a plurality of selector plungers substantially evenly spaced on an endless chain which travels continuously when no records are being played adapted to materially reduce the time required by the machine to start to play any record when selected or after the completion of the playing of a record being played.

Another feature of the invention relates to the novel arrangement of clutches, cams and interlocks which sequentially apply power to the various elements of the machine and control the operation of the selector mechanism, tone arms and the like, and which govern the use and prevent misuse of the machine, all automatic and responsive to push button selection of a program from either or both sides of a plurality of records placed in the record magazine of the machine.

Another feature of the invention is the particular arrangement of the selector mechanisms employed which provides freedom of changing, adding to or deducting from any selections once made except the selection being played without stopping the machine.

Another feature of the invention relates to means for discontinuance of the playing of any selection during the playing thereof without affecting the subsequent playing of any other selection or selections previously made.

Other objects and features of the invention will become apparent by reference to the following detailed description taken in connection with the accompanying drawings, in which:

Fig. 5 is a cross sectional view of the front half of the automatic phonograph taken on the line 5—8 of Fig. 2 showing the record holders, record selecting mechanism and the front tone arm in a neutral position.

Fig. 6 is an enlarged vertical sectional view taken on the line 6—6 of Fig. 5 showing a set of levers which control one of the record holders.

Fig. 7 is a detailed sectional view taken on the line 7—7 of Fig. 5 showing one of two record supporting idler rolls mounted in each record holder.

Fig. 8 is a cross sectional view of the rear half of the automatic phonograph taken on the line 5—8 of Fig. 2 showing the record holders and rear tone arm in a neutral position.

Fig. 9 is a detailed cross sectional view taken on the line 9—9 of Fig. 8 showing the ball spaced pivotal mounting of the record holders.

Fig. 10 is an enlarged fragmentary detailed cross sectional view of the novel record selector mechanism employed showing one of the record selectors and one of the record selector push rods in their neutral position.

Fig. 11 is a fragmentary cross sectional view showing the record selector push rod mechanism disclosed in Fig. 9 moved to its operating position.

Fig. 12 is a skeletonized cross sectional view taken on the line 12—13 of Fig. 3 showing the front half of one of the record selector mechanisms and the cams operating the same after having tilted a record holder to the position in which the left side of the record carried thereby is played; the movement of the front tone arm lever and the tone arm link rod being indicated in dot and dash lines.

Fig. 13A is an enlarged elevational view of one of the two tone arm and tone arm carriages employed moved to a position central with respect to a record holder by the tilting of the record holder.

Fig. 14 is an enlarged detailed view part in section and part in elevation showing the transmission, cam clutch, cam clutch solenoid plunger, record selector cam and tone arm cam.

Fig. 15 is a detailed plan view of the transmission, selector chain drive slip clutch, cam clutch, cam clutch solenoid plunger, record selector cam and tone arm cam taken on the line 15—15 of Fig. 14.

Fig. 16 is an enlarged elevational view of the lower right half of the automatic phonograph showing the main driving mechanism thereof.

Fig. 17 is an enlarged elevational view of the lower left half of the automatic phonograph showing the front tone arm carriage, tone arm lever, selector rods and levers, etc., all in a neutral position.

Figs. 18 and 19 are enlarged front and side elevational views respectively of the novel tone arm carriage centering devices preferably employed.

Fig. 20 is an enlarged plan view of the left front half of the automatic phonograph having various portions successively cut away to show clearly the relationship of the various parts of the record holder and selector mechanisms with respect to each other; the front tone arm and the front tone arm carriage being omitted.

Fig. 21 is an enlarged plan view of the left rear half of the automatic phonograph having various portions successively cut away showing the rear tone arm and the rear tone arm carriage in their neutral position.

Fig. 22 is an enlarged fragmentary elevational view of the automatic phonograph having various portions successively broken away to show clearly the relationship of the various parts of the record holder and selector mechanisms with respect to each other; the front tone arm and the front tone arm carriage being omitted.

Fig. 23 is an enlarged sectional view taken on the line 23—23 of Fig. 8 showing the rear anchorage of the record holder centering devices.

Fig. 28 is a front elevational view of the control panel of the automatic phonograph.

Fig. 29 is a diagrammatic view showing the electric circuits controlling the operation of the automatic phonograph.

Fig. 30 is a vertical sectional view taken on the line 30—30 of Fig. 28 showing the momentary contact type cut-out switch preferably employed.

In the following detailed description of the illustrative embodiment of the invention shown in the drawings like reference numerals refer to like and corresponding parts throughout the several views.

General description

Figure 1:
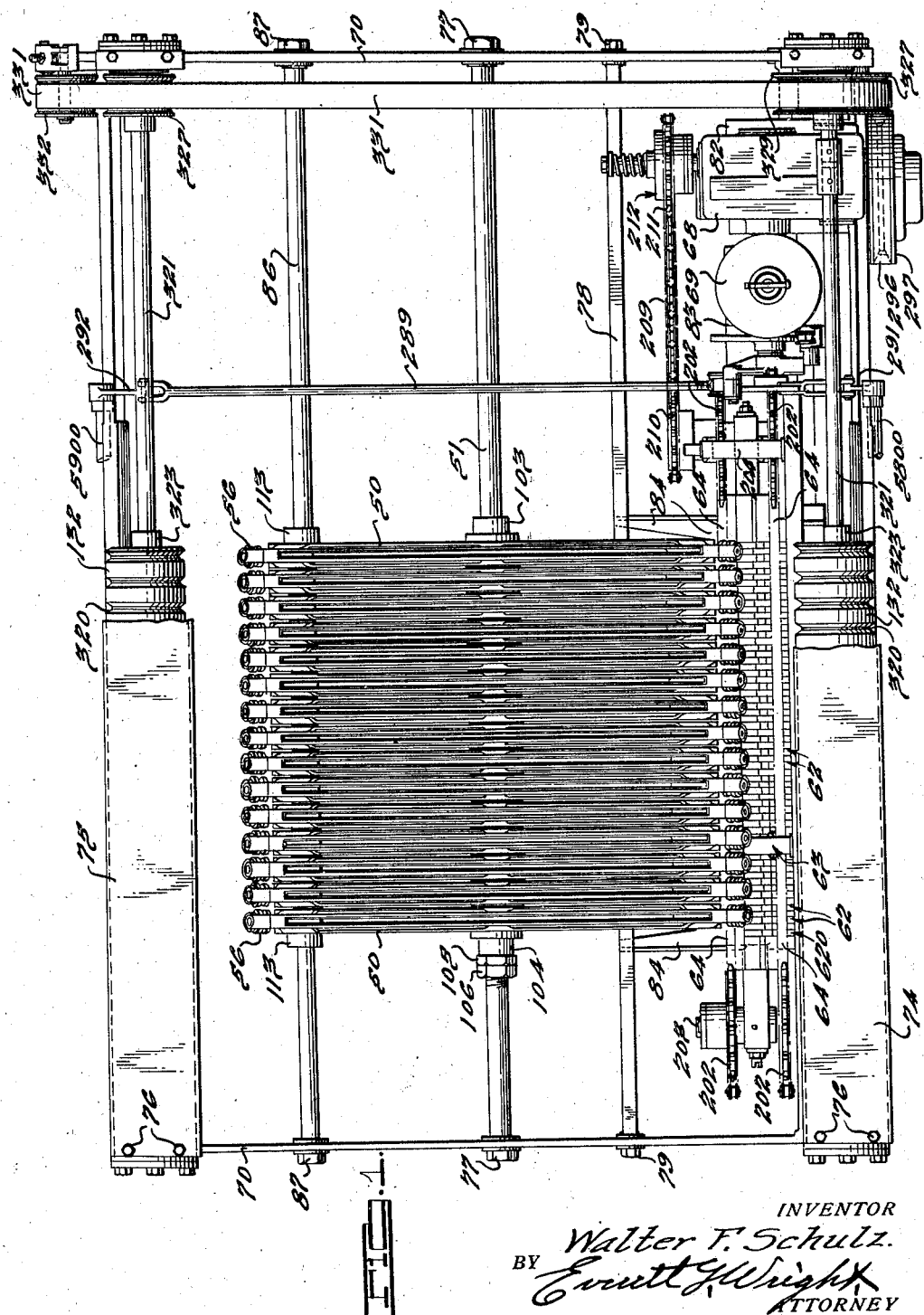
Fig. 1 is a plan view of an automatic phonograph embodying the invention with the front and rear tone arms and tone arm carriage mechanisms omitted, certain upper portions of the machine being broken away to show more clearly the construction therebelow.

A brief general description will be given first followed by a more detailed description of the construction and operation of the machine. The novel automatic phonograph disclosed in the drawings employs a record magazine consisting of a plurality of record holders 50 mounted on a common record holder shaft 51 so as to tilt independently of each other either to the front or to the rear of the machine and carry the outer sound groove of records disposed therein into alignment with the needle of either the front tone arm 52 or rear tone arm 53 which are adapted to play either the right or left side respectively of the record carried by the particular record holder that is tilted.

The front and rear tone arms 52 and 53 are mounted on front and rear tone arm carriages 54 and 55 respectively. One of the said tone arm carriages is brought into a central position with respect to the record holder of a record selected for playing by the tilting of the said record holder forward which brings the front tone arm 52 carried by the front tone arm carriage 54 into playing position adjacent the right side of the record carried by a record holder or rearward which brings the rear tone arm 53 carried by the rear tone arm carriage 55 into playing position adjacent the left side of the record carried by the record holder. Rollers 56 mounted on both sides of the record holders 50 are positioned to engage one of the suitably curved guides 57 of the tone arm carriages 54 and 55 during the tilting of any one of the record holders 50 either forwardly or rearwardly whereby to move either the front or the rear tone arm carriage 54 or 55 into playing position central with respect to the particular record holder which is tilted.

The front and rear tone arms 52 and 53 are mounted on their respective tone arm carriages 54 and 55 in such a manner as to permit the said tone arms to be urged laterally by front or rear tone arm positioning levers 58 and 59 respectively which places the needle carried by the front or rear tone arm 52 or 53 into playing contact with the sound groove on the right or left side of a record carried by the particular record holder which had previously been tilted forwardly or rearwardly respectively in response to the preselection by the operator of the machine. The said tone arms 52 and 53 are pivoted for movement normal to the face of the records under adjustable spring pressure to admit of regulation of the pressure of the tone arm needles on the records. The said tone arms 52 and 53 are also pivoted and counterweighted for movement in a direction parallel to the face of the records whereby to permit the said tone arms 52 and 53 to follow the path of the sound grooves of a record being played and return to their neutral position by gravity after the completion of the playing of a record.

The said tone arm carriages 54 and 55 are each provided with a centering device 60 which automatically returns the said tone arm carriages to a central neutral position with respect to the record magazine after the completion of playing any side of any record.

The selector mechanism employed is arranged to permit the operator of the automatic phonograph to select for playing either side of any record or series of records placed in the record holders of the record magazine by pushing a corresponding selector button extending through the selector panel 61 of the machine. The selector buttons are preferably marked 1L, 1R, 2L, 2R, etc., designating the record number and side thereof which may be selected thereby for playing.

The selector buttons 1L, 1R, 2L, 2R, etc., are each secured to the end of a selector push rod and stop assembly 62 located to stop and position one of a plurality of continually moving selector plunger assemblies 63 mounted on a pair of endless chains 64 in alignment with the corresponding record holder tilting lever 65L or 65R connected to each of the record holders 50. After becoming properly positioned, the said selector plunger 63 tilts the selected record holder 50 responsive to movement of an arcuately moving record selector plunger operating lever 66 either toward the front or toward the rear of the machine which causes the front or rear tone arm carriage to bring the front tone arm 52 or the rear tone arm 53 into playing position adjacent the particular side of the record to be played.

The entire mechanism for selecting and playing records responsive to pressing the selector buttons 1L, 1R, 2L, 2R, etc., causing the single or sequential playing of one or more sides of one or more records pre-selected from records placed in the record magazine of the machine is preferably operated automatically by a continuously running single source of power through a series of suitable clutches, cams, levers and interlocks hereinafter described in detail together with a detailed description of the construction and operation of the various elements of the machine.

The said interlocks are arranged to permit the operator of the machine to change, omit or add to any selection or group of selections previously chosen for playing except the particular selection being played at the time the change of program is being made, however, a cut-out button extending through the selector panel 61 is provided to momentarily close an electric control circuit as hereinafter described in detail which stops the playing of any selection being played at any time after it has once started to play whereupon the machine automatically starts to play the next selection if any has been made or it remains silent until another selection is made.

A more detailed description of the construction and operation of the machine will now be given.

Frame

The machine includes two preferably cast metal end panels or frames 70 spaced by front and rear longitudinally disposed lower I-bars 71 and 72 secured therebetween by suitable machine bolts 73 extending through the said end frames 70. The top of the said end panels or frames 70 are spaced by front and rear longitudinally disposed upper channel struts 74 and 75 secured to the top corners of the said cast metal end frames 70 by suitable machine bolts 76. The common record holder shaft 51 on which the record holders 50 of the record magazine are pivotally mounted is supported by and through the said end frames 70 in such a manner as to serve as an end frame spacer and is preferably secured against turning with respect to the said end frames 70 by suitable nuts 77 threaded on the outer extending ends thereof.

Figure 4:
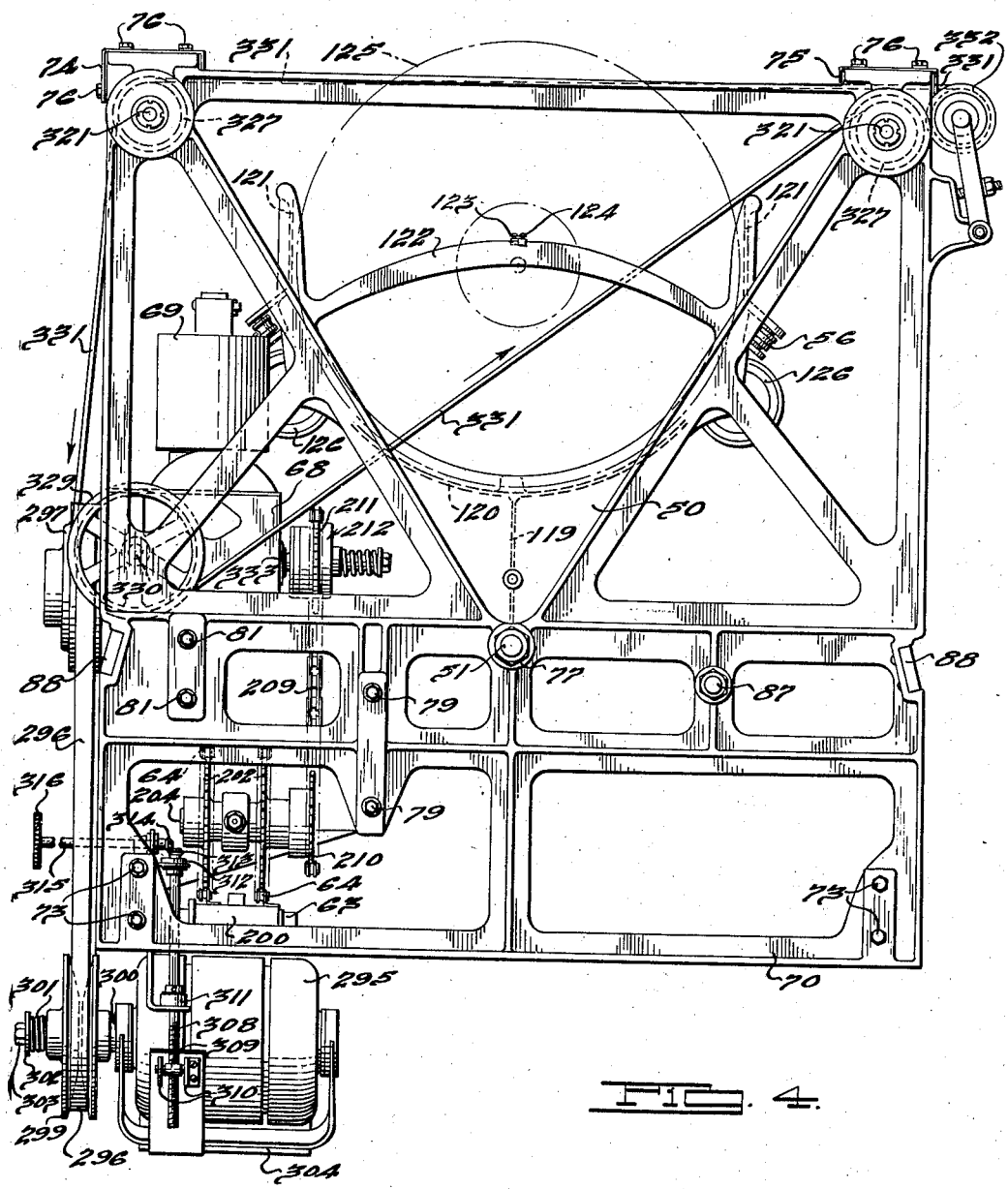
Fig. 4 is an end elevational view showing the right end of the automatic phonograph and the means employed for regulating the speed of playing records thereby.

A suitably shaped preferably cast longitudinal beam 78 which supports the record holder tilting levers 65L and 65R is located forwardly from and parallel to the said central record holder shaft 51. The said beam 78 serves as a spacer for the end frames 70 and is secured to and supported from the end frames 70 by suitable machine bolts 79 extending through the said end frames 70. Another suitably shaped cast longitudinally disposed beam 80 secured to and supported from the said end frames 70 by suitable machine bolts 81 extending through the said end frames 70 as best shown in Figs. 4 and 5 is located forward from and in spaced relationship to the record holder tilting lever supporting beam 78. The said beam 80 supports the arcuately movable selector plunger operating lever 66 keyed on the plunger lever shaft 67 as hereinafter described. Suitable pads 82 and 83 are preferably cast integral with the top of the said beam 80 near the right end of the machine upon which the transmission unit 68 and the solenoid unit 69 respectively are supported. The record selector push rod and stop assemblies 62 are supported as hereinafter described in detail from secondary members of a specially shaped and generally horizontally and longitudinally disposed casting 84 secured to and supported from the top of the front lower I-bar 71 and from the bottom of the said longitudinal record holder tilting lever supporting beam 78 by machine screws or the like.

A plurality of transversely disposed anchorage rods 85 disposed and secured between the top of the record holder tilting lever supporting beam 78 and the selector plunger operating lever shaft supporting beam 80 prevent lateral deflection of the top of the said beams 78 and 80 during the operation of the record holder selection and tilting mechanism supported thereby. A preferably shouldered longitudinally disposed record holder centering device anchorage shaft 86 having securing nuts 87 threaded on the ends thereof is secured between and through the said cast end frames 70 in the rear central portion of the machine to serve as a longitudinally disposed strut between the said end frames 70.

In addition to the foregoing framing, a tone arm carriage track 88 consisting of a suitably formed and grooved longitudinally disposed bar is secured across both the front and rear of the machine. The said tone arm carriage tracks 88 span between the end frames 70 and are secured to the front and rear faces thereof by machine screws 89. The end frames 70 are suitably beveled at the point of supporting the said tone arm carriage tracks 88 to hold the said tone arm carriage tracks 88 at the preferred slope as best indicated in Figs. 5 and 8.

Record magazine

In the particular embodiment of the invention disclosed, the record magazine consists of fifteen generally Y-shaped record holders 50 suitably bored near the bottom central portion thereof and bushed with a Babbitt or other metal bushing 100 to admit of tiltably mounting the same on the record holder shaft 51 with a minimum of friction as best shown in Figs. 8 and 9. The said record holders 50 are preferably laterally spaced by anti-friction thrust balls 101 positioned in suitably disposed races 102 formed in each face of each record holder 50 in spaced relationship to and around the record holder shaft 51. The said record holders 50 are fixed longitudinally along the record holder shaft 51 between a fixed collar 103 and a take-up collar 104 thereon, the said take-up collar 104 being adjustable longitudinally against the record holders 50 by a suitable adjusting nut 105 threaded on the record holder shaft 51 which is locked in its adjusted position by a lock nut 106, see Fig. 1. The face of each collar 103 and 104 adjacent the end record holders 50 of the record magazine is provided with a ball race similar to the races 102 provided in each face of each record holder 50 to receive anti-friction thrust balls 101 which space the said end record holders 50 from the said collars 103 and 104 in a like and similar manner to the anti-friction ball spacing of the said record holders 50 as shown in detail in Fig. 9. The construction of the take-up collar 104 is indicated in Fig. 22 which shows thrust balls 101 positioned in races 102 cut in the face of the take-up collar 104 adjacent the face of the first record holder from the left end of the machine.

Figure 13:
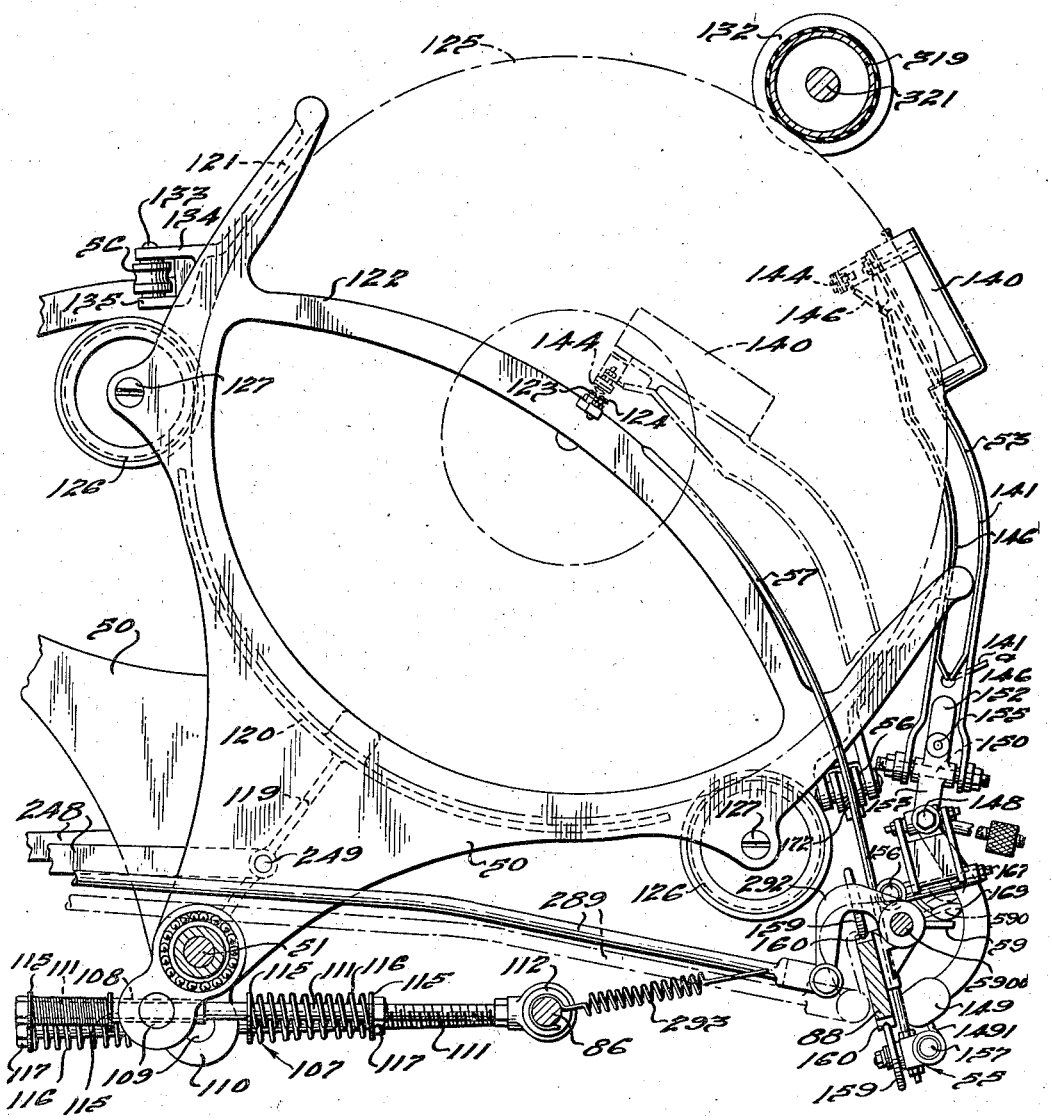
Fig. 13 is a skeletonized cross sectional view of the rear half of the machine taken on the line 12—13 of Fig. 3 showing a record holder tilted to the position in which the left side of a record carried thereby is played; the movement of the rear tone arm lever and the tone arm link rod being indicated in dot and dash lines.

Each record holder 50 is provided with a record holder centering device generally designated by the numeral 107 throughout the drawings located below the record holder shaft 51 which yieldably maintains each record holder 50 in its normal vertical neutral position as best shown in Figs. 1, 2, 3, 4, 5 and 8. The said record holder centering devices 107 permit the record holders 50 to be tilted either toward the front of the machine or toward the rear of the machine by record holder tilting mechanism as hereinafter described. Figs. 12 and 13 each show the near record holder 50 therein tilted toward the rear of the machine and the remaining record holders 50 held by their record holder centering devices 107 in their normal vertical neutral position.

Referring now to Figs. 5, 8, 9, 12, 13 and 23, each record holder centering device generally designated by the numeral 107 comprises a preferably square tubular sleeve 108 pressed through the center of a pivot pin 109 journaled through the bifurcated depending end 110 of each record holder 50 which permits the said tubular sleeve 108 to pivot in a direction opposite to the tilting of the record holder 50 but on an axis parallel to the axis upon which the said record holder 50 is tilted, see particularly Figs. 9, 12 and 13. The said square tubular sleeve 108 is slidably mounted over a preferably square transversely disposed anchorage rod 111 which has the extreme rear end thereof threaded into an anchorage eye 112 which is pivotally mounted on the longitudinally disposed anchorage shaft 86 between suitably positioned collars 113 thereon. The said collars 113 are preferably fixed by set screws 114 to the said record holder anchorage shaft 86 on each side of the group of fifteen anchorage eyes 112 pivotally mounted thereon to maintain the said anchorage eyes 112 in alignment with the fifteen record holders 50 employed in the record magazine.

A washer 115, a compression type coil spring 116 and another washer 115 are telescoped over the said anchorage rod 111 on each side of the sleeve 108 as best shown in Figs. 5, 8, 12 and 13. The said compression springs 116 telescoped on each anchorage rod 111 located on each side of the square tubular sleeve 108 also telescoped thereon are drawn up to substantially even and firm compression with respect to the said sleeve 108 by means of the compression adjusting nuts 117 threaded on suitably rounded portions of the said anchorage rod 111 whereby to yieldably maintain each record holder 50 in its central vertical neutral position as best shown in Figs. 5 and 8.

When a record holder 50 is tilted as shown in Figs. 12 and 13, the depending bifurcated end 110 of the record holder 50 moves in the opposite direction to the direction in which the record holder is tilted and carries with it the tubular sleeve 108 journaled therein which compresses one of the compression springs 116 against its adjusting nut 117. When the record holder tilting mechanism releases its tilting thrust or pull on a record holder 50, the record holder centering device 107 brings the said record holder 50 back to its central vertical neutral position by the thrust exercised by the compressed compression spring 116 against the lower depending end 110 of the record holder 50. Inasmuch as a compression spring 116 is adjusted to react firmly in substantially equal firm compressed relationship against each side of the tubular sleeve 108, it is obvious that practically all undesirable pendulum action will be avoided when a record holder centering device 107 brings its record holder 50 back to a neutral vertical central position after the record carried thereby has been played.

Each record holder 50 is preferably cast not only Y-shaped but is preferably cast to provide spaced sides 118 above the bushing 100 thereof suitably separated by webs 119, 120 and 121 as best shown in Figs. 5, 7, 8 and 9. An arched shaped bridge 122 connects each vertically disposed fork of the Y-shaped record holder 50 on each side 118 thereof and serves to support centrally disposed ground contacts 123 and 124 used to complete a solenoid cam control circuit upon the completion of the playing of either side of a record carried by a record holder 50. The records shown by dot and dash lines 125 throughout the drawings are not supported directly in the record holder 50 but are supported on two idler rolls 126 carried thereby, one of which is journaled between the spaced sides 118 at each fork of the Y-shaped record holder 50 on the shank of a suitable shouldered machine screw 127 as best shown in Fig. 7.

Each idler roll 126 is preferably centrally bored and babbitted at 128 to assure free and substantially frictionless rotation on the shank of the said shouldered machine screw 127 on which the said idler roll 126 is journaled. Suitable washers 129 preferably of an anti-friction self-lubricating material serve to space the hub 130 of each idler roll 126 from the spaced sides 118 of the record holder 50. The periphery of each idler roll 126 is preferably provided with a record carrier facing 131 of rubber or the like suitably V-grooved to receive and support the periphery of a record 125 placed in the record holder 50 and maintain the said record in a true vertical central position therein free to rotate when the upper periphery of the said record 125 becomes frictionally engaged upon tilting of the record holder 50 in one of the V-grooved driving rolls 132 disposed longitudinally along the upper front and rear corners of the machine and rotated as hereinafter described in detail.

Each record holder 50 is provided with a peripherally grooved roller 56 on the outside of each fork thereof journaled on a suitable shaft 133 parallel to and radially disposed with respect to the record holder shaft 51 supported between outwardly extending lugs 134 and 135 cast integral with and extending from the lower end of the upper webs 121 of the said record holder 50 as best indicated in Figs. 5 and 8. These rollers 56 are positioned to engage one of the suitably curved guides 57 of the tone arm carriages 54 and 55 during the tilting of a record holder 50 either forwardly or rearwardly for moving either the front or rear tone arm carriages 54 or 55 central with respect to the particular record holder 50 which is tilted.

Tone arms and tone arm carriages

The particular embodiment of the invention disclosed in the drawings employs a front tone arm 52 and a rear tone arm 53 each having a suitable electric tone pick-up 140 mounted on the upper end thereof from which suitable electrical leads 141 are run to the amplifier unit 142 as diagrammatically shown in Fig. 29. Contactors 143 and 144 mounted on the upper end of the front and rear tone arms 52 and 53 respectively complete a solenoid cam control circuit through leads 145 and 146 respectively as diagrammatically shown in Fig. 29 when either contactor 143 or 144 on the front or rear tone arm 52 or 53 respectively is grounded by contact with either of the ground contacts 123 or 124 respectively on any of the record holders 50 upon the completion of playing a record by the pick-up 140 of either tone arm 52 or 53. Each tone arm pick-up 140 employs the usual pick-up needle 147 which is firmly but removably engaged therein in such a manner as to admit of easy and rapid changing when the point thereof becomes worn.

The front and rear tone arms 52 and 53 are each mounted on a longitudinally disposed tone arm pivot 148 which permit the said tone arms 52 and 53 to be pivoted in a direction parallel to the face of a record being played. The front tone arm 52 or the rear tone arm 53 is pivoted toward the center of the machine during the playing of the right or left side respectively of a record 125 positioned in a record holder 50 by the action of the spiral sound groove of the said record 125 which is engaged by the needle 147 of one of the tone pick-ups 140. The extreme pivoted position of the rear tone arm 53 is shown by the dot and dash lines generally designated by the numeral 530 in Fig. 13. The said tone arms 52 and 53 are each counterweighted by a suitable depending counterweight 149 and an auxiliary adjustable counterweight 1490 extending laterally outward from a pivot block 153 carrying the longitudinally disposed tone arm pivots 148 on which the said tone arms 52 and 53 return back to their normal neutral substantially vertical position shown in Figs. 5, 8, 12, 13 and 13A after the playing of one side of a record thereby. A suitably shaped stop 1491 depending from each counterweight 149 comes to rest against the lower longitudinally disposed tone arm carriage frame member 157 as shown in Figs. 13 and 13A when the tone arm 52 or 53 is brought by its counterweights 149 and 1490 to its normal neutral substantially vertical position.

The said longitudinally disposed tone arm pivots 148 are preferably so located with respect to a record 125 carried by any record holder 50 when tilted to its playing position that the path traveled by the pick-up needle 147 of the tone pick-ups 140 is substantially tangent to the sound grooves in a record 125 during the entire playing thereof.

The tone arms 52 and 53 are each pivoted on a transversely disposed tone arm pivot 150 located above and at right angles to the said longitudinally disposed pivot 148 and are each resiliently urged by an adjustable compression spring 151 against a stop 152 extending upwardly from the generally vertically disposed bi-directional pivot block 153 through which the longitudinally disposed tone arm pivot 148 and the transversely disposed tone arm pivot 150 are journaled, see Figs. 2, 12, 13 and 13A. A set screw 1520 threaded through each tone arm 52 and 53 provides adjustment between the tone arms 52 and 53 and the said stop 152 of each bi-directional tone arm pivot block 153, see Fig. 13A. The said stop 152 limits the pivoting of a tone arm 52 or 53 in a direction normal to the records 125 carried by the record holders 50, and, by the aid of the said compression spring 151 maintains the said tone arm 52 or 53 yieldably in a substantially vertical position ready to be brought into resilient playing contact with the right or left sides respectively of any record as hereinafter described. The pressure between each tone arm pick-up needle 147 and a record being played is regulated and maintained in accordance with the adjustment of the said compression spring 151 controlled by the turning of a knurled take-up nut 154 located at the back of each of the tone arms 52 and 53 threaded on the extending end of a spring retaining headed stud 155 telescoped through the said stop 152 and extending through a suitably located aperture in the said tone arm 52 or 53.

Referring now particularly to Figs. 12, 13, 13A, 17 and 21, the front and rear tone arm carriages 54 and 55 each are constructed of upper and lower longitudinally disposed frame members 156 and 157 onto the extreme ends of which are fixed inwardly extending brackets 158. A tone arm mounting wheel 159 is journaled on a spindle preferably formed integral with and extending inwardly from each of the said brackets 158. The periphery of each of the tone arm mounting wheels 159 is preferably formed complementary to V-grooves 160 formed in the top and bottom of the tone arm carriage tracks 88.

The extreme or outer lower ends 161 of each of the two tone arm carriage guides 57 of each tone arm carriage 54 and 55 are sweated or otherwise fixed through the brackets 158 on the upper longitudinally disposed tone arm carriage frame member 156 and are adjustably fixed in telescopic relationship through the brackets 158 on the lower longitudinally disposed tone arm carriage frame member 157 by means of adjusting nuts 162 located above and below the said brackets 158 on the lower tone arm carriage frame member 157 and threaded on the lower threaded end of the extreme or outer lower ends 161 of the tone arm guides 57 whereby to admit of supporting the tone arm carriages 54 and 55 on the tone arm track 88 by adjusting the wheels 159 of the said tone arm carriages 54 and 55 into traveling engagement in the V-grooves 160 of the said tone arm tracks 88. The central or inner lower ends 163 of each of the two tone arm carriage guides 57 of each tone arm carriage 54 and 55 are secured to and through brackets 1580 and 1581 on the upper and lower longitudinally disposed tone arm carriage members 156 and 157 and space the said upper and lower horizontally disposed tone arm carriage members 156 and 157 in a like or similar manner as the extreme or outer lower ends 161. The said extreme and central lower ends 161 and 163 of the two tone arm carriage guides 57 of each tone arm carriage 54 and 55 serve as vertically disposed tone arm carriage frame members, the said tone arm carriage guides 57 being so firmly anchored to the longitudinally disposed tone arm carriage guide frame members 156 and 157 as to make the tone arm frame guides 57 substantially rigid with respect to the tone arm carriages 54 and 55.

The front and rear tone arms 52 and 53 are each supported on the tone arm carriages 54 and 55 respectively in such a manner as to permit the front and rear tone arm positioning levers 58 and 59 to move the front and rear tone arms 52 and 53 laterally and place the pick-up needle 147 of the tone arm pick-ups 140 thereon in the sound groove on the right or left side respectively of a record selected for playing after its record holder has been tilted in response to selector mechanism as hereinafter described to the front or rear of the machine respectively. To accomplish the foregoing, the longitudinally disposed tone arm pivot 148 is pivoted and supported at each end on transversely disposed pins 164 which are each in turn journaled in the upper end of a pair of upwardly disposed spaced links 165 and 166. The lower ends of each pair of the said upwardly disposed spaced links 165 and 166 are journaled on a pair of longitudinally spaced supporting pins 167 cantilevered outwardly from the bracket 1580 on the upper longitudinally disposed tone arm carriage frame member 156 in a direction normal to the tone arm carriage 54 or 55. Thus, the tone arms 52 and 53 are each mounted movable longitudinally on their tone arm carriages 54 and 55 respectively by such means as the hereinbefore described parallelogram type mounting of the main longitudinal pivot 148 of each tone arm on the pair of longitudinally disposed spaced supporting pins 167 cantilevered outwardly normal from each tone arm carriage 54 and 55.

The pair of upwardly disposed spaced links 166 of the said parallelogram type tone arm mounting is preferably provided with integral arms 168 forming a lever which extends longitudinally outward therefrom normal to the axis of the pin 167 on which the pair of links 166 is journaled as best shown in Figs. 2, 12, 13, 13A, 17 and 21. The outer ends of the arms forming the lever 168 converge and carry thereon a semi-spherically faced bearing 169 which is maintained into contact with the tone arm positioning lever 58 or 59 by means of a tension spring 170 anchored at one end to the pair of spaced links 166 having the lever 168 formed extending therefrom and at the other end on a suitable spring anchorage 171 located on the upper right hand tone arm carriage bracket 158 of the tone arm carriage 54 or 55. Each tone arm 52 and 53 is maintained in its neutral longitudinal position as shown in Figs. 2, 5, 8, 12, 13, 13A, 17 and 21 on its carriage 54 or 55 respectively by the bearing 169 of the lever 168 of its parallelogram type mounting which is supported on the front or rear longitudinally disposed tone arm positioning lever 58 or 59 respectively; the contact of the semi-spherical bearing 169 of each lever 168 on the tone arm positioning lever 58 and 59 respectively permits substantially frictionless longitudinal travel of the tone arm carriages 54 and 55 with respect to the said tone arm positioning levers 58 and 59 respectively.

When the tone arm levers 58 and 59 are moved arcuately upward as indicated by the dot and dash lines 580 and 590 in Figs. 12 and 13, the tone arms 52 and 53 on tone arm carriages 54 and 55 are each moved longitudinally by the lever 168 of its parallelogram type mounting toward a record 125 which has been tilted by its record holder 50 for playing and moves the pick-up needle 147 of the tone pick-ups 140 mounted on the said tone arms into resilient engagement with the sound groove in either the right side or left side of the record 125 positioned in any record holder 50 which has been tilted for playing either to the front or to the rear of the machine respectively; the tilting of a record holder 50 to the front or to the rear of the machine automatically centers the tone arm carriage 54 or 55 with respect to the tilted record holder and brings the tone arm 52 or 53 adjacent to the record 125 carried thereby. No matter where either tone arm carriage 54 and 55 may be positioned along the tone arm tracks 88, the tone arms 52 and 53 are moved longitudinally as hereinbefore described by the arcuate movement of the tone arm positioning levers 58 and 59 for bringing the pick-up needle 147 of the tone pick-up 140 into resilient playing engagement with the sound grooves in either the right or the left side of a record 125 positioned in any record holder 50 which has been tilted for playing either to the front or to the rear of the machine respectively. The longitudinal movement of the tone arms 52 and 53 is sufficient to bring into action the pivoting of the said tone arms 52 or 53 on their transversely disposed pivot 150 when the pick-up needle 147 of the pick-up 140 on either tone arm 52 or 53 is brought into engagement with the sound groove on one side of a record 125 carried by any record holder 50 whereby to establish and maintain a resilient playing contact between the said pick-up needle 147 and the sound groove on one side of the said record 125.

Figure 2:
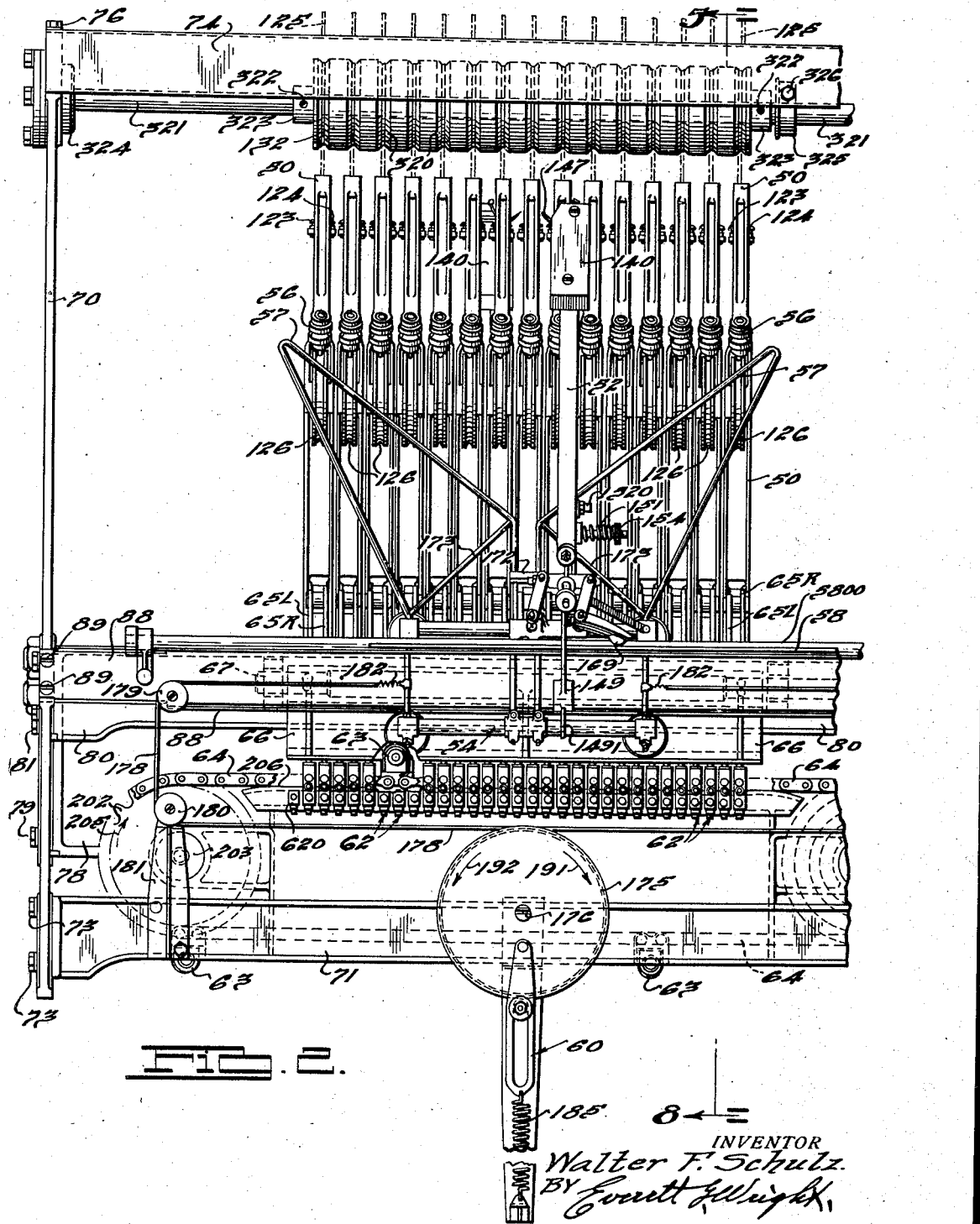
Fig. 2 is a partial front elevational view showing the left half of the automatic phonograph with the front tone arm and the front tone arm carriage mechanism shown in their neutral position.

The said tone arm carriages 54 and 55 are each free to be moved longitudinally along its track 88 to a position central with respect to any record holder 50 by the tilting of the record holder 50 from its central neutral position, however, the tone arm carriages 54 and 55 are each normally maintained longitudinally central with respect to the record magazine as shown in Fig. 2 opposite the eighth record holder 50 from either end of the record magazine by a suitable tone arm centering device generally designated by the numeral 60 throughout the drawings.

As hereinbefore described, the tone arm carriages 54 and 55 are each provided with a pair of guides 57 having their lower vertical ends 161 and 163 fixed to and through the brackets 158 on the upper and lower longitudinal tone arm carriage frame members 156 and 157, the lower ends 161 and 163 of the said tone arm guides 57 serving as vertically disposed tone arm carriage frame members. It is readily observed that this construction rigidly cantilevers the pair of tone arm guides 57 of each tone arm carriage 54 and 55 upwardly from the said tone arm carriage. Each tone arm carriage guide 57 is more or less triangular in shape and is formed to a suitable curvature and is so mounted upwardly from its tone arm carriage as to permit one of the rollers 56 of one of the said record holders 50 to engage the upper curved portion thereof during the tilting of the said record holder 50 and serve as a roller cam for moving the tone arm carriage 54 or 55, as the case may be, by one or the other of the tone arm carriage guides 57 thereof central with respect to the particular record holder 50 tilted. The front or rear roller 56 of the particular record holder 50 which is tilted comes to rest between the lower central ends 163 of the pair of tone arm guides 57 of the tone arm carriage 54 or 55 respectively above and against a horizontally disposed stop 172 fixed between the said lower central ends 163 of the said tone arm guides 57 above the upper longitudinal tone arm carriage frame member 156. Each tone arm guide 57 is preferably braced by a suitable diagonally disposed strut 173 which prevents racking or distortion of the tone arm guides 57 when pressure is exerted thereon by a roller 56 of a record holder 50 during the tilting thereof.

*Tone arm carriage centering device*

A tone arm carriage centering device generally designated by the numeral 60 in the drawings is mounted on the front and rear of the machine on brackets 174 suitably supported from the lower front and rear longitudinally disposed frame members 71 and 72 respectively central with respect to the eighth record holder 50 from each end of the record magazine. In the particular and preferred tone arm carriage centering device employed, a centering drum 175 is journaled on a suitably shouldered machine bolt 176 disposed through the center of the upper arm 177 of the said bracket 174. A tone arm carriage centering cable 178 is wrapped one or more turns around the centering drum 175 which causes the said centering drum 175 to rotate a portion of a turn when the said tone arm carriage centering cable 178 is pulled to the left or right from the said centering drum 175 as the tone arm carriage 54 or 55 attached to the said tone arm centering cable 178 is moved to the right or left along its tone arm carriage track 88. The said tone arm centering cable 178 runs over suitably disposed upper and lower guide pulleys 179 and 180 journaled on the tone arm carriage track 88 and brackets 181 respectively as best shown in Figs. 2, 3, 16 and 17. The said tone arm centering cable 178 of each tone arm centering device 60 is preferably connected to the extreme frame members 161 of the tone arm carriage 54 or 55 by means of suitable tension springs 182 which maintain the said tone arm centering cable 178 taut and compensate for any stretching thereof.

The centering drum 175 of the said tone arm carriage centering device 60 has a normally vertically depending centering bar 183 pivotally fixed thereto below the center thereof by a suitably shouldered machine screw 184. The said centering bar 183 is resiliently anchored in its vertical position as shown by the full lines in Fig. 18 by means of a tension spring 185 connected to the bottom of the said centering bar 183 and to a Z-bar spring anchorage 186 fixed to the lower depending end of the tone arm carriage centering device supporting bracket 174. The centering bar 183 is provided with a vertically disposed slot 187 therein through which a preferably shouldered centering bar guide 188 is disposed; the said centering bar guide 188 also serves as a fixed pivot around which the centering bar 183 is pivoted when it is raised by the rotation of the centering drum 175. The said centering bar guide 188 is preferably fixed in alignment with the vertical center of the centering bar 183 spaced from the tone arm carriage centering device bracket 174 just below the centering drum 175 by means of a machine bolt 189 having a spacer sleeve 190 telescoped thereover as indicated in Fig. 19.

Referring now particularly to Figs. 2, 17, 18 and 19, when the tone arm carriage 54 or 55 is moved along its track 88 to the left or to the right, the centering drum 175 of the tone arm carriage centering device 60 connected thereto by the centering cable 178 as hereinbefore described rotates a fraction of a turn clockwise or counter-clockwise respectively as indicated by the arrows 191 or 192 respectively in Figs. 2 and 18 which simultaneously pivots and raises the centering bar 183 with respect to its combined guide and fixed pivot 188 to positions as indicated by the dot and dash lines 193 and 194 respectively in Fig. 18. As the centering bar 183 is pivoted and raised by the rotation of the centering drum 175 when the tone arm carriage 54 or 55 is moved along its track 88 by the tilting of a record holder 50 as hereinbefore described, the tension spring 185 constantly urges the centering bar 183 to bring the tone arm carriage 54 or 55 back to its normal central neutral position with respect to the record magazine from whence it had been moved, and, when the tilted record holder 50 is returned to its vertical neutral position and releases the tone arm carriage 54 or 55 which had been moved thereby central thereto, the centering bar 183 is pulled by the tension spring 185 from its pivoted and raised position to its neutral vertical central position indicated by the full lines 183 in Fig. 18 whereupon the centering drum 175 is rotated by the said centering bar 183 back to its neutral position which in turn pulls the tone arm carriage 54 or 55 by the tone arm centering cable 178 back to its central neutral position with respect to the record magazine.

By employing the particular preferred tone arm carriage centering device disclosed herein, the tension on the tone arm centering cable 178 is not increased an unreasonable amount when a tone arm carriage is moved in either direction to its extreme position. Also, the tension spring 185 which resiliently anchors the centering bar 183 in its central neutral position is required to expand very little in proportion to the travel of a tone arm carriage centered thereby which admits of the use of a heavier spring 185 than ordinarily would be possible thereby assuring positive action of the tone arm carriage centering device with little or no over-ride when centering a tone arm carriage 54 or 55 with respect to the record magazine from its extreme positions of travel along the tone arm carriage track 88.

*Record selector mechanism*

The record selector mechanism employed is adapted to permit the operator of the automatic phonograph disclosed herein to select for playing either side of any record or series of records 125 positioned in the record holders 50 of the record magazine by pushing one or more of the selector buttons marked 1L, 1R, 2L, 2R to 14L, 14R, 15L and 15R inclusive extending through the selector panel 61 of the machine which are each secured to the end of a selector push rod and stop assembly generally designated by the numeral 62 in the drawings. Each pair of selector buttons 1L and 1R, 2L and 2R, etc., control the tilting of one of the fifteen record holders 50. The pushing of any numbered R selector button causes the particular record holder 50 controlled thereby to tilt to the front of the machine and places the right side of a record 125 previously loaded in the said record holder 50 into position for playing by the front tone arm pick-up 140 mounted on the front tone arm 52 after the records controlled by all lower numbered buttons and the same numbered L button which have been previously pushed have been played. Likewise, the pushing of any numbered L selector button causes the particular record holder 50 controlled thereby to tilt to the rear of the machine and places the left side of a record 125 previously loaded in the said record holder 50 into position for playing by the rear tone arm pick-up 140 mounted on the rear tone arm 53 after the records controlled by all lower numbered buttons which have been previously pushed have been played.

In response to pushing any numbered L or R selector button, the corresponding record holder 50 is tilted to the rear or to the front of the machine as hereinafter described in detail by a selector plunger 63 which actuates one of the individual sets of two record holder tilting levers 65L and 65R respectively connected to each record holder 50.

In the embodiment of the invention disclosed four selector plungers 63 are employed. Each selector plunger 63 is mounted for reciprocation in a suitable housing 200 which in turn is secured to a pair of transversely spaced longitudinally disposed normally continuously running selector plunger carrying chains 64 by means of a pair of angle clips 201. The said selector plunger carrying chains 64 travel over sprockets 202 which rotate in a clockwise direction on longitudinally spaced sprocket shafts 203 and 204 as indicated by the arrows 205 in Figs. 2, 3, 16 and 17 which causes the selector plungers 63 and their housings 200 to travel from left to right over chain supporting tracks 206 formed at the top of longitudinally disposed secondary frame members 207 and 208 preferably cast integral with the longitudinally disposed casting 84 secured to and supported from the top of the front lower I-bar 71 and from the bottom of the longitudinal record holder tilting lever supporting beam 78, see Figs. 10 and 11.

The said longitudinally disposed secondary frame member 208 is preferably provided with an upwardly disposed longitudinally extending rib 2080 located between the selector plunger chain supporting tracks 206 and in alignment with the lower portion of the lug 213 integral with and depending from each selector plunger housing 200 which takes the thrust of the selector plunger housing 200 when the spring loaded selector plunger 63 therein is moved against the record holder tilting levers 65L or 65R. Also, the lower flange of the cast longitudinal beam 80 is suitably formed and located above the selector plunger chain supporting tracks 206 to clear the top of the selector plunger housings 200 carried by the selector plunger carryng chains 64 and yet prevent a selector plunger housing 200 from being lifted when the selector plunger 63 therein is actuated by the selector plunger operating lever 66.

The four selector plungers 63 are sufficiently spaced along the pair of selector plunger carrying chains 64 to prevent more than one selector plunger 63 from being carried thereby into the plane of the record holder tilting levers 65L and 65R at any time thus preventing the possibility of more than one record holder 50 being tilted into playing position at the same time. The selector plunger chains 64 and sprockets 202 are driven by a chain drive 209 connected between a sprocket 210 keyed on the selector plunger chain sprocket shaft 204 and a sprocket 211 of the friction clutch 212 of the transmission unit 68. The said friction clutch 212 permits the selector plunger carrying chains 64 to stop traveling immediately when a lug 213 on the housing 200 of any selector plunger 63 travels against the stop 214 of any push rod and stop assembly 62.

Referring now particularly to Figs. 10, 11 and 12, the selector plunger 63 is preferably provided with an enlarged cylindrical portion 215 by means of which it is reciprocatingly fitted in its housing 200. A compression spring 216 located within the housing 200 acts against the annular shoulder 217 at one end of the enlarged cylindrical portion 215 of the plunger 63 to constantly urge the said selector plunger 63 to its retracted neutral position as best shown in Fig. 10. An annular stop 218 near one end of the selector plunger 63 limits its movement against any of the record holder tilting levers 65L and 65R of any record holder 50 opposite which any selector plunger 63 may be positioned, and, a spring ring 219 snapped in a suitably annular groove cut in the selector plunger 63 near the other end thereof limits the movement of the said selector plunger 63 against the face of the arcuate moving record selector plunger operating lever 66. Each housing 200 of each selector plunger 63 is provided with a suitable lug 213 preferably cast integral therewith and depending therefrom located to engage the stop 214 of any push rod and stop assembly 62 as best shown in Figs. 10 and 11. Each housing 200 of the selector plunger 63 is also provided with a suitably grounded preferably resilient contactor 220 which momentarily completes a solenoid cam control circuit that governs the operation of the machine as hereinafter described in detail by coming in contact with the contact point 221 of any push rod and stop assembly 62 just prior to the time the lug 213 of the housing 200 of a selector plunger 63 comes to rest against the stop 214 of any push rod and stop assembly 62.

Each push rod and stop assembly generally designated by the numeral 62 throughout the drawings comprises a push rod 222 slidably mounted at the front of the machine through suitably spaced apertures in a T-shaped casting 223 secured to the rear of the front selector panel 61 by machine screws 224. The said push rod 222 is also slidably mounted at the central portion of the machine through suitably spaced apertures in the secondary frame member 207 as best shown in Figs. 10 and 11. The extreme inner end of each push rod 222 has a stop 214 fixed thereon which is moved by the push rod 222 in a direction parallel thereto between guides 225 preferably cast integral with and disposed transversely between the longitudinally disposed secondary frame members 207 and 208. The said guides 225 for the stop 214 of each push rod assembly 62 prevent any lateral movement of the stop 214 when the lug 213 on one of the housings 200 of the selector plungers 63 is brought against the upper end of said stop 214 by the selector plunger carrying chains 64 as best shown in Fig. 11.

The stop 214 on the end of a push rod 222 of a push rod and stop assembly 62 is shown in its neutral position in Fig. 10 wherein it permits the selector plungers 63 to be carried past the same by the selector plunger carrying chains 64. However, when a push rod 222 of a push rod and stop assembly 62 is pushed in by pressing a selector button 226 marked 1L or 1R or 2L or 2R, etc., the stop 214 on the end of the push rod 222 is moved into alignment with the lug 213 on the housing 200 of the selector plungers 63 as shown in Fig. 11 which causes the nearest selector plunger 63 to the stop 214 to become aligned with the record holder lever 65L or 65R corresponding to the particular selector button pressed whereupon the corresponding record holder 50 is tilted in accordance with the selection made as hereinafter described in detail.

A contact block 227 is fitted on the push rod 222 adjacent a suitably disposed shoulder 228 thereof and is maintained fixed to the said push rod by a set screw 229 as best shown in Fig. 10. The contact block of each push rod and stop assembly 62 is provided with a contact point 221 insulated therefrom and so located as to become in alignment with the resilient contactor 220 on the housing 200 of the selector plungers 63 when the push rod and stop assembly 62 is pushed to its "in" position as shown in Fig. 11. The said contact point 221 on each contact block 227 is positioned along the line of travel of the resilient contactor 220 on the housing 200 of any selector plunger 63 so as to admit of only a momentary completion of the solenoid cam control circuit by the contactor 220 contacting the said contact point 221 just prior to the time the lug 213 of the housing 200 of a selector plunger 63 comes to rest against the stop 214 of any push rod and stop assembly 62. An electrical connection 230 runs from the contact point 221 on each contact block 227 to the cam control solenoid 69 as best indicated in the wiring diagram shown in Fig. 29.

The top of the said contact block 227 has a groove 232 cut therein parallel to the push rod 222 on which the said contact block 227 is fixed. A suitably shaped click bar 233 is pivoted in the said groove 232 on a horizontally disposed pivot pin 234 and is resiliently held in its neutral position as indicated in Fig. 10 by means of a suitable compression spring 235. The said click bar 233 is provided with a suitably sloping top and vertically disposed upper end 236 located above the top of the contact block 227, see Fig. 10, in alignment with the annular stop 218 of one of the selector plungers 63 which becomes positioned by the stop 214 on the push rod 222 directly over the contact block 227 as indicated in Fig. 11 after the stop and push rod assembly is pushed to its "in" position. When the selector plunger 63 is actuated by the selector plunger operating lever 66 and is moved from its neutral position shown in Fig. 11 to its fully actuated position shown in Fig. 12, the annular stop 218 of the said selector plunger 63 passes completely over the sloping top of the click bar 233 to permit the vertically disposed upper end 236 of the click bar 233 to be engaged by the annular stop 218 of the selector plunger 63 when the said selector plunger 63 returns to its neutral position as shown in Fig. 10 whereupon the entire push rod and stop assembly 62 is returned by the selector plunger 63 to its "out" or neutral position also shown in Fig. 10. The selector plunger 63 is then carried by its selector plunger carrying chains 64 to the next push rod and stop assembly 62 which has been pushed to its "in" position by the selection of the operator or user of the machine.

Each push rod and stop assembly 62 is provided with a spring loaded toggle lever mechanism disposed below the contact block 227 thereon which pushes the push rod and stop assembly all the way into its "in" or selected position after it has been pushed manually by the operator of the machine part way "in" when the operator of the machine selects records or sides thereof for playing by pushing selector buttons 226 on the end of push rods 222. Likewise, when a selector button 226 on the end of a push rod 222 is pulled or pushed part way "out" after having been once pushed "in", the said spring loaded toggle lever mechanism completes the outward movement of said push rod 222.

The said spring loaded toggle lever mechanism of each push rod 222 comprises a toggle lever 237 pivoted at its upper end in a slot 238 in the bottom of the contact block 227 by means of a pivot 239. The toggle lever 237 is provided with a guide pin 240 extending therethrough parallel to its pivot 239 but located near the lower end thereof. A housing 241 is secured to the horizontally and longitudinally disposed casting 84 and is provided with one spring loaded plunger 242 for each push rod and stop assembly 62 located directly below and centered with respect to the location of the pivot 239 and guide pin 240 of the toggle lever 237 when the said toggle lever 237 is in a vertically disposed position. The spring loaded plunger 242 constantly applies upward pressure to the rounded bottom of the toggle lever 237 which is positioned between vertically disposed guides 243 extending upwardly from the housing 241 and parallel to the toggle lever 237, the said guides 243 being bifurcated as indicated by the numeral 244 in Fig. 10 to accommodate the guide pin 240 of the said toggle lever 237. Thus, the toggle lever 237 is constantly urged by the spring loaded plunger 242 to complete the inward or outward movement of the push rod 222 of a push rod and stop assembly 62 after the push rod 222 is pushed part way "in" or pulled part way "out" by the operator of the machine when making or changing the selection of any record or side thereof from records which have been loaded in the record holders 50 of the record magazine.

To prevent the operator or user of the machine from pulling out the push rod and stop assembly 62 corresponding to a selection being played, a safety device is provided which comprises a pin 245 fixed in depending relationship through each selector plunger 63 so as to protrude through a suitable slot 246 provided in the bottom of the housing 200 of each selector plunger 63. An upwardly disposed dog 247 on the stop 214 of each push rod and stop assembly 62 is located to contact the pin 245 depending from a selector plunger 63 when the said selector plunger 63 has been moved by the selector plunger operating lever 66 to its fully actuated position shown in Fig. 12 whereby to prevent the outward movement of the push rod and stop assembly 62 during the playing of any record. This safety device protects the selector mechanism from damage if an attempt is made to change a selection previously made during the playing thereof. It will be noted that all other push rod and stop assemblies 62 except the push rod and stop assembly corresponding to a selection being played may be pushed "in" or pulled "out" by the selector button 226 on the end of the push rod 222 thereof at the will of the user or operator of the machine.

When a selector plunger 63 carried by the selector plunger carrying chains 64 is engaged by a stop 214 of any push rod and stop assembly 62 after the said stop 214 has been placed in the path of the selector plunger 63 by pushing any numbered L or R selector button as hereinbefore described in detail, the selector plunger 63 is positioned opposite the corresponding record holder tilting lever 65L or 65R of a set of two record holder tilting levers connected to each record holder 50 which are adapted to tilt the said record holder 50 to the rear or front of the machine respectively responsive to the movement of the selector plunger 63 by the selector plunger operating lever 66.

Referring now particularly to Figs. 5, 6, 10 and 12, each record holder 50 is connected to its set of two record holder tilting levers 65L and 65R by a common link 248 pivotally connected at one end to the record holder 50 at its center above the record holder shaft 51 by a suitable pivot pin 249 and pivotally connected at its other end to both of the record holder tilting levers 65L and 65R by means of a common pivot pin 250. The record holder tilting lever 65L which tilts the record holder 50 to the rear of the machine as illustrated in Fig. 12 is pivoted on its fulcrum 251 disposed through a suitable bifurcated lever mounting bracket 252 which has the shank 253 thereof adjustably fixed through the record holder tilting lever supporting beam 78 near the bottom thereof by means of a nut 254. A suitably curved nib 255 is formed on each record holder tilting lever 65L opposite the selector plunger 63 to permit the center of the selector plunger 63 to contact the said record holder tilting lever 65L during the entire stroke of the selector plunger 63.

The record holder tilting lever 65R which obviously tilts the record holder 50 to the front of the machine is pivoted on its fulcrum 256 disposed through a suitable bifurcated lever mounting bracket 252 which has the shank 253 thereof adjustably fixed through the record holder tilting lever supporting beam 78 near the top thereof by means of a nut 254. The lower end of the said record holder tilting lever 65R is provided with a suitably curved nib 257 to permit the center of the selector plunger 63 to contact the said record holder tilting lever 65R during the entire stroke of the selector plunger 63.

The record holder lever 65R is provided with a vertically slotted hole 258 through which the pivot pin 250 common to both record holder tilting levers 65L and 65R of each set of record holder tilting lever connected to a record holder 50 is disposed which compensates for the difference in the arcs described by the record holder tilting levers 65L and 65R around their respective fulcrums 251 and 256 and admits of the use of a single common link 248 between each pair of record holder tilting levers 65L and 65R and the record holder 50 tilted either to the rear or front of the machine thereby.

Operating cams

There is one set of two axial cams and two individual radial cams that are simultaneously rotated intermittently 180 degrees by the said set of axial cams which operate the machine under the control of an electric solenoid circuit as hereinafter described.

The set of axial cams employed comprises two axially disposed cams 260 and 261 located at 180 degrees with respect to each other on a cam disc 262 preferably formed integral with the driven member 263 of the jaw clutch generally designated by the numeral 264 throughout the drawings. The driving member 265 of the said jaw clutch 264 is keyed on the end of the continuously rotating power take-off shaft 266 of the transmission unit 68. The power take-off shaft 266 is preferably provided with a small extending end 267 onto which one end of the cam shaft 268 is journaled. The cam shaft 268 is supported near its outer end on and is journaled through a suitable bracket 269 by means of a sleeve type bearing 270. The said cam shaft 268 is prevented from moving on its longitudinal axis by the hub of the selector plunger lever operating cam 280 and the hub of the tone arm placing cam 285 keyed thereto on each side of the said bracket 269 by suitable keys 271. The driven member 263 of the jaw clutch 264 is splined on the cam shaft 268 and is constantly urged by a compression spring 272 into mesh with the driving member 265 of the jaw clutch 264. The said compression spring 272 is disposed around the cam shaft 268 and is located between the selector plunger operating cam 280 and the hub of the driven member 263 of the jaw clutch 264 splined on the said cam shaft 268, see Figs. 14 and 15.

Figure 25:
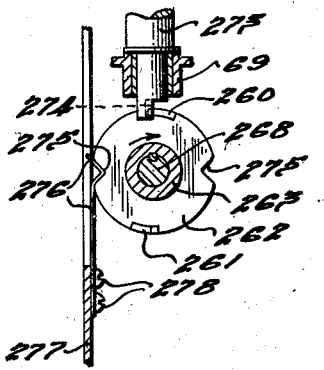
Fig. 25 is a fragmentary elevational view showing the axial cam surfaces of the cam clutch controlling the rotation of the main cam shaft which carries the record selector plunger operating cam and the tone arm positioning cam.
Figure 26:
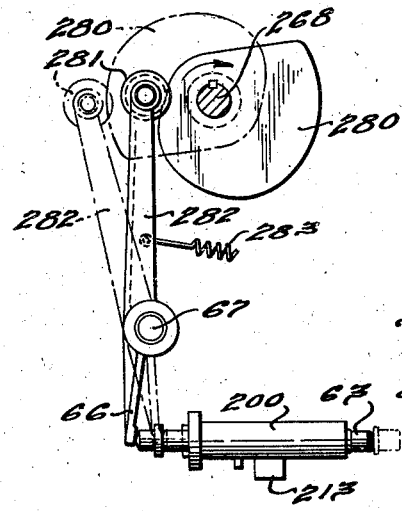
Fig. 26 is a fragmentary elevational view showing the operation of the record selector plunger operating cam.

A solenoid plunger 273 of the solenoid unit 69 having a beveled cam contact face 274 complementary to the faces of the axial cams 260 and 261 on the cam disc 262 as best shown in Figs. 14 and 15 is constantly urged by its weight and a suitable spring 690 in the top of the said solenoid unit to its depending neutral position shown in Figs. 14, 15 and 25. When the solenoid plunger 273 is in its neutral de-energized depending position, the cams 260 and 261 alternately come in contact with the cam contact face 274 of the said solenoid plunger 273 and disengage the jaw clutch 264 after 180 degrees of rotation of the cam shaft 268 following the release of the driven member 263 of the jaw clutch by the momentary raising of the solenoid plunger 273 by a momentary closing of the solenoid circuit as hereinbefore described in detail. It is readily observed that each time the solenoid circuit is momentarily closed the cam shaft 268 is rotated 180 degrees by the constantly rotating power take-off shaft 266 of the transmission unit 68.

The said cam disc 262 is preferably provided with a pair of oppositely disposed suitably shaped notches 275 in the periphery thereof located 90 degrees with respect to the axial cams 260 and 261 thereon which cooperate with the spring detent 276 fixed to the solenoid unit support 277 by machine screws 278 as best shown in Fig. 25 to eliminate any possible over-ride of the cam shaft 268 beyond 180 degrees rotation each time it is rotated.

A selector plunger operating cam 280, one of the two individual radial cams that are simultaneously rotated 180 degrees by the said cam shaft 268 responsive to the momentary raising of the solenoid plunger 273 is keyed to the said cam shaft 268 by a key 271 in alignment with a shouldered cam follower roller 281 journaled on the upper end of the selector plunger operating lever arm 282 of the flat radial selector plunger operating lever 66. The said selector plunger operating lever arm 282 extending substantially diametrically opposite from the said selector plunger operating lever 66 is mounted for radial movement on the selector plunger operating lever shaft 67. A tension spring 283 connected between the selector plunger operating lever actuating arm 282 and the record holder tilting lever supporting beam 78 maintains the cam follower 281 against the face of the selector plunger operating cam 280 at all times.

Figure 27:
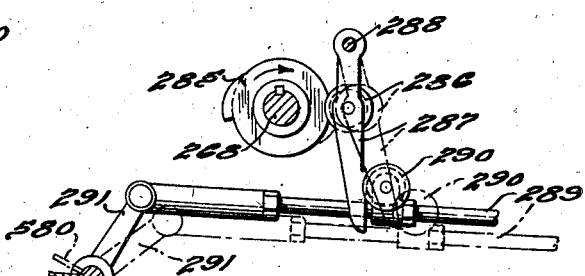
Fig. 27 is a fragmentary elevational view showing the operation of the tone arm positioning cam.

The tone arm placing cam 285, the other of the two individual radial cams that are simultaneously rotated 180 degrees by the said cam shaft 268 responsive to the momentary raising of the solenoid plunger 273, is keyed to the said cam shaft 268 by a key 271 in alignment with a shouldered cam follower 286 journaled between the arms of a bifurcated pivoted cam lever 287 pivotally supported from a fixed pivot pin 288. The said bifurcated pivoted cam lever 287 actuates a link rod assembly 289 by contact against a pair of anti-friction rollers 290 adjustably fixed thereon. The said link rod assembly 289 is pivotally connected at each end to the shafts 5800 and 5900 of the front and rear tone arm positioning levers 58 and 59 respectively by rigid arms 291 and 292 extending from each tone arm positioning lever shaft 5800 and 5900 respectively as best shown in Figs. 1, 12 and 13. Responsive to the rotation of a radial tone arm placing cam 285, the front and rear tone arm positioning levers 58 and 59 are both simultaneously moved arcuately from their neutral position shown by the full lines in Figs. 12, 13 and 27 to their upward position 580 and 590 as indicated by the dot and dash lines in Figs. 12, 13 and 27 which moves each tone arm 52 and 53 longitudinally in playing position by means of the lever 168 of its parallelogram type mounting as hereinbefore described in detail. A tension spring 293 connected between the said link rod assembly 289 and the record holder centering device anchorage shaft 86 as best shown in Fig. 13 maintains the cam follower 286 against the tone arm positioning cam 285 at all times and returns the tone arm positioning levers 58 and 59 to their neutral position when permitted by the rotating of the tone arm placing cam 285.

Although the preferred profile of the selector plunger operating cam 280 and tone arm placing cam 285 has been shown in the drawings and the preferred timing of the functions performed by the said cams has been indicated diagrammatically in Fig. 29 and will be hereinafter described in detail under the heading "Operation of the machine", it is obvious that the profile of the said cams may be altered to provide other desirable timing.

*Power unit and drives*

The power unit consists of an electric motor 295 and a transmission unit 68 which runs continuously while the machine is in use from which the various elements of the machine are driven. The electric motor 295 is connected to the transmission unit 68 by a V-belt 296 running between a pulley 297 keyed on the high speed shaft 298 of the transmission unit 68 and a split pulley 299 mounted on the shaft 300 of the motor 295.

In order to provide control of the speed of the playing of a record by the machine, the motor pulley 299 is preferably split and has the centrally disposed face of each half thereof radially beveled complementary to the sides of the V-belt running therebetween. The halves of the split pulley 299 are resiliently urged together by a compression spring 301 disposed around the extended end of the motor shaft 300 which reacts against a disc 302 secured to the end of the motor shaft 300 by a suitable stud 303 as indicated in Fig. 4. The motor 295 is fixed in a cradle 304 which is pivotally suspended on one side on a pivot 305 which is suspended from a bracket 306 secured to the bottom of the front lower longitudinal I-bar 71 by the bolts 307. The other side of the cradle 304 is suspended on a suspension rod 308 threaded through a nut 309 pivotally fixed in a bifurcated bracket 310 secured on the side of the cradle 304 opposite its pivotal support 305 thereof.

The said suspension rod 308 is rotatably supported and maintained in vertical relationship on a thrust bearing 311 and through a radial bearing 312 which are secured to the I-bar 71 by suitable brackets as shown in Fig. 4. The top of the said suspension rod 308 has a bevel gear 313 fixed thereon which is meshed with a complementarily beveled gear 314 keyed on the end of a horizontally disposed speed control shaft 315 journaled on the top of the I-bar 71 and extending through the selector panel 61 of the machine as shown in Figs. 4 and 28. A preferably knurled speed regulator knob 316 fixed on the end of the said horizontally disposed shaft 315 turnable by the operator of the machine from the selector or control panel 61 raises and lowers the electric motor 295 on its pivotal mounting 305 whereby to change the center distance between the pulleys 297 and 299 simultaneously with automatically changing the diameter at which the V-belt 296 runs in the spring loaded split pulley 299 which admits of minute regulation of the speed of playing of a record by the machine. The said speed regulator knob 316 is preferably marked "Slow-Fast" as indicated in Fig. 28 to advise the operator of the results accomplished by turning the said knob to the left or right.

A record 125 disposed in any record holder 50 on the V-grooved record supporting and centering idler rolls 126 thereof is free to rotate when the record holder 50 is tilted to bring the periphery of the said record 125 into contact with one of the V-grooved continuously running record driving rolls 132 rotatably mounted along the upper front and rear corners of the machine.

The said V-grooved record driving rolls 132 are preferably formed of rubber or like resilient material mounted on a tubular core 319. Each record driving roll 132 has one V-groove 320 therein disposed opposite each record holder 50 into which a record 125 registers when tilted as indicated in Fig. 13. The shape and size of the V-grooves in the said record driving rolls 132 are such as will permit a record 125 to be frictionally engaged and turned by the said record driving rolls 132 whenever a record holder 50 positions the peripheral edge of a record in one of the said V-grooves of the record driving rolls 132. The rubber or like resilient material of which the record engaging face of the record driving rolls 132 and the record supporting idler rolls 126 are constructed and the shape of the V-grooves of the record driving rolls 132 and the record supporting idler rolls 126 are such as will admit of reasonable variations in the diameter of the records 125, however, it is contemplated that the record supporting idler rolls 126 of the record holders 50 or the record driving rolls 132 may be mounted on movable centers to accommodate variations in the diameter of records 125. The present available standard 12 inch record discs vary in diameter between 11⅞ inches and 12 inches, however, the said record driving rolls 132 and the said record supporting idler rolls 126 of the record holders 50 may be movably mounted to accommodate both 10 and 12 inch records as well as minor variations in the diameter thereof.

Figure 3:
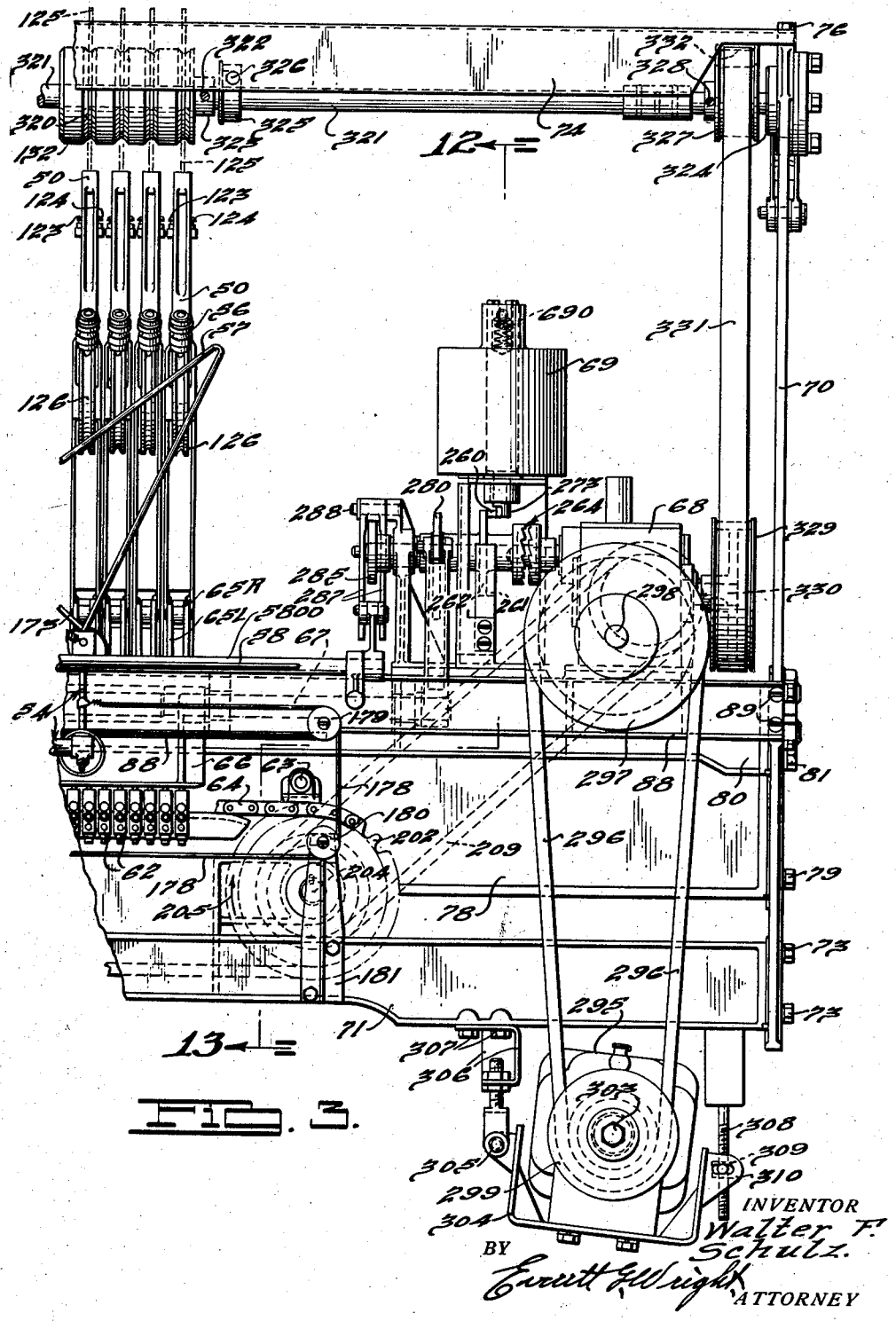
Fig. 3 is a partial front elevational view showing the right half of the automatic phonograph.

Each record driving roll 132 is fixed in its proper longitudinal position with the V-grooves 320 thereof in alignment with the center of the record holders 50 on a rotating record driving shaft 321 by such means as the set screws 322 disposed radially through the supporting collars 323 of each record driving roll 132 which extend from the ends of the said record driving rolls 132 in the manner indicated in Figs. 2 and 20. The record driving shafts 321 are rotatably supported on suitable anti-friction bearings 324 mounted in the upper corners of the end frames 70 as indicated in Figs. 2 and 3. Each record driving shaft 321 is also supported near the center thereof to avoid vibration on an intermediate anti-friction bearing 325 secured by a suitable bolt 326 to the front or rear upper longitudinally disposed channel strut 74 or 75, as the case may be.

Each record driving shaft 321 has a pulley 327 fixed thereon by means of a suitable set screw 328 disposed through the collar thereof. The said pulleys 327 are aligned with the record drive pulley 329 keyed on a power take-off shaft 330 of the transmission unit 68 which rotates at the desired pre-determined speed. However, the minute speed of the record driving shaft 321 may be regulated as desired by the V-belt-split pulley speed changing means hereinbefore described in detail under control of the operator of the machine by turning the speed regulator knob 316. The driving shafts 321 are rotated in opposite directions as indicated by the arrows in Figs. 5 and 8 to each other by means of a flat belt 331 running around the pulley 329 keyed on the power take-off shaft 330 of the transmission unit 68, around the pulley 327 fixed on the front record driving shaft 321, over the pulley 327 fixed on the rear record driving shaft 321 and around a take-up pulley 332 pivotally mounted on the rear of the right end frame 71 of the machine preferably as shown in Fig. 4.

Another power take-off shaft 333 of the transmission unit 68 rotating at the desired predetermined speed is provided with a friction clutch 212 comprising inner and outer clutch plates 334 and 335 preferably keyed and splined respectively on the said power take-off shaft 333 between which a driven sprocket member 211 journaled on the said power take-off shaft 333 is disposed. Suitable annular clutch linings 336 are interposed between each clutch plate 334 and 335 and the driven sprocket member 211. The outer portion of the said power take-off shaft 333 has a compression spring 337 of suitable strength telescoped thereon which reacts against a washer 338 and a nut 339 threaded on the extreme outer end of the said power take-off shaft 333 and constantly urges the clutch plates 334 and 335 into axial friction contact with the lined driven sprocket member 211 for driving the said driven sprocket member 211 of the friction clutch 212. However, when a selector plunger 63 carried by the selector plunger chains 64 running on sprockets 202 comes to rest against any stop 214 of the record selector mechanism, the chain drive 209 which normally rotates the sprockets 202 as hereinbefore described in detail stops moving and the driven sprocket member 211 of the friction clutch 212 slips between the clutch plates 334 and 335 until the stop 214 releases the selector plunger 63.

The other drive from the transmission unit 68 consists of a third power take-off shaft 266 rotating at the desired predetermined speed onto which the driving member 265 of the jaw clutch 264 of the cam shaft drive is keyed as hereinbefore described in detail under the heading "Operating cams."

The split pulley speed control of the high speed shaft 298 of the transmission unit 68 has the primary function of controlling the speed of playing a record by the machine. Because of the fact that the speed of the power take-off shafts 266 and 333 are extremely slow in comparison to the speed of the power take-off shaft 330 from which records 125 are rotated by the record driving rolls 132, the operation of the cam disc 262, the operation of the selector plunger operating cam 280 and the operation of the tone arm placing cam 285 from the power take-off shaft 266 and the travel of the selector plungers 63 through the friction clutch 212 on the power take-off shaft 333 are not materially affected by the minute regulation of the speed of playing a record by the machine by the split pulley speed control of the high speed shaft 298 of the transmission unit 68.

*Operating controls and interlocks*

A master switch 340 is provided which, when closed by pressing the Start button on the face of the selector panel 61, applies power to the various elements of the machine substantially as shown in the preferred wiring diagram shown in Fig. 29. Inasmuch as the amplifier unit 142, speaker 342 and their controls regulated by Volume and Tone control knobs on the face of the selector panel 61 are of any standard construction and not a part of this invention, they have not been described in detail herein, however, they have been indicated in their preferred relationship to the novel automatic phonograph herein disclosd in the wiring diagram shown in Fig. 29 and in the front elevational view of the selector or control panel 61 of the machine. A suitable relay switch 343 normally closed during the operation of the machine operable responsive to the master switch 340 has been included which breaks the solenoid control circuit as indicated in Fig. 29 when the master switch 340 is opened by pressing the Stop button on the face of the selector panel 61 and thereby acts as a protective device when the machine is shut off.

The record selection responsible to pushing one or more of the selector buttons 226 numbered 1L, 1R, 2L, 2R, etc., and the regulation of the speed of playing any record or records by turning the Slow-Fast knob 316, all conveniently located on the selector or control panel 61, have been hereinbefore described in detail.

To prevent the machine from playing records while making record selections after the master switch 340 of the machine has been closed by pressing the Start button on the selector panel 61, an extra push rod and stop assembly 620 similar to the push rod and stop assemblies 62 but without a contact point 221 thereon is provided at the left of the push rod and stop assemblies 62. This additional push rod and stop assembly 620 when pushed "in" stops the movement of the selector plungers 63 while the user or operator of the machine is pushing various numbered selector buttons 226 during the selection of a program. This additional push rod and stop assembly 620 is preferably marked Selector stop on the selector button 226 thereof and is released by manually pulling the said button "out".

A special cut-out switch 344 controlled by the Cut-out button on the face of the selector or control panel 61 is provided to discontinue the playing of any record being played at the will of the user or operator of the machine without affecting the subsequent playing of any other record previously selected for playing. The said cut-out switch 344 is wired so as to momentarily close the solenoid circuit responsive to the pressing and the release of the Cut-out button thereof any time during the playing of a record.

The said cut-out switch 344 is preferably of special construction as shown in Fig. 30 and prevents the operator of the machine from holding the switch in contact position which would damage the operating mechanism of the machine. The said cut-out switch 344 comprises a Cut-out button 345 of Bakelite, fibre or other insulating material pressed into a piston 346 reciprocatingly mounted for limited movement in a cylinder 347. A compression spring 348 constantly urges the Cut-out button to its "out" or extended position through the selector control panel 61 to which the cylinder 347 is secured by suitable machine screws 349.

The said cut-out switch 344 has a fixed contact 350 and a movable contactor 351 both mounted fully insulated from the machine. The contact 350 and the contactor 351 are each provided with a complementarily beveled contact face 352 and 353 respectively which are brought into momentary contact by the spring actuated return movement of the Cut-out button 345. The inner end of the Cut-out button 345 is provided with a frusto-conical disc 354 having its conical plane disposed complementary to the beveled contact face 353 of the movable contactor over which the said frusto-conical disc 354 rides when the Cut-out button 345 is pushed "in" which tilts the said moveable contactor 351 about its pivot 355 which is fixed through a suitably slotted block 356 and permits the base of the said frusto-conical disc 354 to engage the upwardly extending shoulder 357 of the said movable contactor 351. The movable contactor 351 is suitablly slotted at 358 to admit of movement toward the fixed contact 350 on its pivot 355 and is normally supported in a horizontal position on a pin 359 disposed through its mounting block 356. A tension spring 360 secured to the lug 361 of the bracket 362 which supports the slotted mounting block 356 and to the inwardly extending end of the movable contactor 351 yieldably maintains the said movable contactor 351 in its normal neutral horizontal position shown in Fig. 30.

After the Cut-out button 345 is pushed to its "in" position and the base of the frusto-conical disc 354 becomes in engagement with the shoulder 357 of the movable contactor 351, the release of the Cut-out button 345 brings the contact face 353 of the movable contactor 351 in contact with the contact face of the fixed contact 350 and closes the solenoid circuit of the solenoid unit 69. This closing of the solenoid circuit during the release of the Cut-out button 345 after having been pushed "in" is always momentary because of the mechanical relationship of the complementarily beveled faces 352 and 353 respectively of the fixed contact 350 and movable contactor 351 to the particular location of the base of the frusto-conical end 354 of the Cut-out button 345 and because of the tilting of the movable contactor 352 around its pivot 355 by the cam action of the beveled face 353 of the movable contactor 351 when brought against the complementarily beveled face 352 of the fixed contact 350, all as obvious by reference to Fig. 30.

Although the main operating controls and interlocks have been shown in the drawings and described in detail, it is contemplated that other known electrical and mechanical controls may be added or substituted if desired to provide additional or other safe-guards and automatic control of the operation of the machine.

Operation of the machine

The particular embodiment of the automatic phonograph shown in the drawings has been described in detail and a description of the operation of the various elements thereof has been given in connection with the detailed description of the novel mechanisms employed. However, following will be given a brief general description of the operation of the machine as a unitary whole showing the operation of the component parts thereof in relationship to each other.

The record magazine of the automatic phonograph consisting of fifteen record holders 50 is first loaded with a like number of records 125. The operator or user of the machine then selects the particular record or side thereof or a series of records or sides thereof by pushing "in" one or more of the record selector buttons marked IL, IR, 2L, 2R to I5L and I5R which correspond numerically to the fifteen record holders of the magazine and by letter to the left or right side of a record placed therein. For example, if the operator of the machine presses selector buttons IL, IR, 2L, 2R, 4L and I5R, the machine will play the left side of the record positioned in the number 1 record holder, the right side of number 1, the left side of number 2, the right side of number 2, skip to and play the left side of number 4, and skip to and play the right side of the record positioned in the number 15 record holder. After the playing of each selection, the selector buttons corresponding thereto are automatically re-set to their "out" or neutral position. After the selection of records have all been played it is, of course, necessary to make a new selection of records for subsequent programs.

The record selection may take place before or after the master switch 340 has been closed by pressing the Start button on the selector panel. However, if it is desired to hold up the playing of the selections being made until all desired selections have been made, then, the Selector stop button is pushed "in" and no selections will be played by the machine until the Selector stop button is manually pulled "out". Any selection once made may be omitted from a program except a selection being played by manually pulling "out" its numbered and lettered selector button. However, the playing of any selection being played may be stopped instantly by pressing the Cut-out button. The entire machine may be stopped at any time by pressing the Stop button which opens the master switch 340.

When the master switch 340 is closed by the pressing of the Start button, the record selector plungers 63 travel continuously on the selector plunger carrying chains 64 until one of the said selector plungers 63 is engaged by a stop 214 of a selector push rod and stop assembly 62 which has been placed in the path of the selector plungers 63 by pressing the numbered and lettered selector button corresponding thereto. Just prior to stopping against a stop 214 which aligns the record selector plunger 63 with the record holder operating lever 65L or 65R corresponding to the selection, the electric contactor 220 on the housing 200 of the selector plunger 63 momentarily contacts the contact point 221 of the push rod and stop assembly 62 and momentarily closes the electric circuit to the solenoid unit 69 which raises the solenoid plunger 273 and permits the cam shaft 268 to be rotated 180 degrees.

Figure 24:
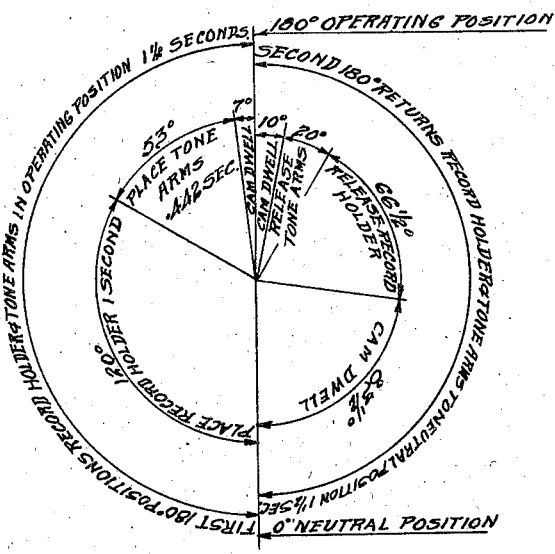
Fig. 24 is a diagrammatic view showing the preferred cycle of cam operation.

During the first 120 degrees of rotation of the cam shaft 268 from its 0 degree neutral position as shown diagrammatically in Fig. 24, the selector plunger operating cam 280 places or tilts the record holder 50 and the record 125 carried thereby in playing position which simultaneously moves a tone arm carriage 54 or 55 central with respect to the tilted record holder 50. During the next 53 degrees of rotation of the cam shaft 268 from its 0 degree neutral position, the tone arm placing cam 285 places the tone arms 52 and 53 in playing position with the pick-up needle 147 of the electric tone pick-up 140 of one of the tone arms in playing registry with the sound groove of the record 125 carried by the tilted record holder 50 which is constantly turned by one of the V-grooved record driving rolls 132 during all the time the record holder 50 is tilted in its playing position. During the last 7 degrees of rotation of the cam shaft 268 from its 0 degree neutral position the cams dwell. After the completion of the rotation of the said cam shaft 268 from its 0 degree neutral position to its 180 degree operating position, it is held by the solenoid plunger 273 of the solenoid unit 69 until the record 125 is completely played or until the operator of the machine pushes the Cut-out button on the selector or operating panel 61.

When the record 125 is completely played, the spiral sound groove of the record will have tilted the tone arm 52 or 53 until the contactor 143 or 144 thereof has contacted the contact 123 or 124 respectively located on the bridge 122 of the record holder 50 which had been tilted whereupon the electric circuit to the solenoid unit 69 is again momentarily closed which raises the solenoid plunger 273 and permits the cam shaft 268 to be rotated another 180 degrees, this time from its 180 degree operating position to its 0 degree neutral position.

During the first 10 degrees of rotation of the cam shaft from its 180 degree operating position as shown diagrammatically in Fig. 24, the cams dwell. During the next 20 degrees of rotation of the cam shaft 268 from its 180 degree operating position, the tone arm placing cam 285 releases the tone arms 52 and 53 and they gravitate to their neutral position. During the next 66½ degrees of rotation of the cam shaft 268 from its 180 degree operating position, the selector plunger operating cam 280 permits the record holder 50 and the record selector plunger 63 which had tilted the record holder 50 to return to their neutral positions, the said selector plunger 63 simultaneously pushing the selector button corresponding to the number and side of the record which just had been played to its "out" position. During the last 83½ degrees of rotation of the cam shaft 268 from its 180 degree operating position, the cams dwell. The selector plungers 63 are again free to travel on the selector plunger carrying chains 64 until one of the said selector plungers 63 is engaged by another stop 214 of another selector push rod and stop assembly 62 whereupon the next selection is played. As hereinbefore mentioned, the timing of the movement of the various elements of the machine may be altered by changing the profile of the selector plunger operating cam 280 and the profile of the tone arm placing cam 285.

Although but one embodiment of the invention has been shown in the drawings and described in detail herein, it is obvious that many changes and modifications may be made in the size, shape, arrangement and detail of the various elements of the invention without departing from the spirit thereof and it is not intended to limit the scope of the invention other than by the terms of the appended claims.

I claim:

1. In an automatic phonograph, the combination of a record magazine comprising a plurality of record holders mounted for movement normal to the axis of rotation of records held therein and adapted to be moved into one or the other of two playing positions, means in each record holder for rotatably supporting a record on its peripheral edge, means for rotating a record carried by any record holder when moved into either playing position, a pair of tone arms including tone pick-ups thereon each mounted for movement parallel to the axis of rotation of records held in said record holders and adapted to be placed in juxtaposition to one side or the other of a record carried by any record holder responsive to the moving of the record holder into one or the other of the said two playing positions, means for moving any record holder into either playing position, and means for placing the tone pick-up of the tone arm juxtaposed to the rotating record in playing contact thereagainst.

2. In an automatic phonograph, the combination of a record magazine comprising a plurality of record holders pivotally mounted for movement normal to the axis of rotation of records held therein and adapted to be tilted into one or the other of two playing positions, means in each record holder for rotatably supporting a record on its peripheral edge, means for rotating a record carried by any record holder when tilted into either playing position, a pair of tone arms including tone pick-ups thereon each mounted for movement parallel to the axis of rotation of records held in said record holders and adapted to be placed in juxtaposition to one side or the other of a record carried by any record holder responsive to the tilting of the record holder into one or the other of the said two playing positions, means for tilting any record holder into either playing position, and means for placing the tone pick-up of the tone arm juxtaposed to the rotating record in playing contact thereagainst.

3. In an automatic phonograph, the combination of a record magazine comprising a plurality of record holders mounted for movement normal to the axis of rotation of records held therein and adapted to be moved into one or the other of two playing positions, means in each record holder for rotatably supporting a record on its peripheral edge, means for rotating a record carried by any record holder when moved into either playing position, a pair of tone arms including tone pick-ups thereon each mounted for movement parallel to the axis of rotation of records held in said record holders and adapted to be placed in juxtaposition to one side or the other of a record carried by any record holder responsive to the moving of the record holder into one or the other of the said two playing positions, means responsive to manual pre-selection for moving any one or more of the record holders sequentially into either playing position, and means for placing the tone pick-up of the tone arm juxtaposed to the rotating record in playing contact thereagainst.

4. In an automatic phonograph, the combination of a record magazine comprising a plurality of record holders pivotally mounted for movement normal to the axis of rotation of records held therein and adapted to be tilted into one or the other of two playing positions, means in each record holder for rotatably supporting a record on its peripheral edge, means for rotating a record carried by any record holder when tilted into either playing position, a pair of tone arms including tone pick-ups thereon each mounted for movement parallel to the axis of rotation of records held in said record holders and adapted to be placed in juxtaposition to one side or the other of a record carried by any record holder responsive to the tilting of the record holder into one or the other of the said two playing positions, means responsive to manual pre-selection for tilting any one or more of the record holders sequentially into either playing position, and means for placing the tone pick-up of the tone arm juxtaposed to the rotating record in playing contact thereagainst.

5. In an automatic phonograph, the combination of a record magazine comprising a plurality of record holders mounted for movement normal to the axis of rotation of records held therein and, means in each record holder for rotatably supporting a record on its peripheral edge, a pair of tone arms including tone pick-ups thereon each mounted for movement parallel to the axis of rotation of records held in said record holders and adapted to follow the sound groove in a record when placed in playing contact thereagainst, means for moving any record holder and the record carried thereby into one or the other of two playing positions, means for moving one or the other of the said tone arms into juxtaposition with respect to one side or the other of a record carried by any record holder when moved into one or the other of the said playing positions, means for rotating the record carried by any record holder when moved into either playing position, and means for placing the tone pick-up of the tone arm juxtaposed to the rotating record in playing contact thereagainst.

6. In an automatic phonograph, the combination of a record magazine comprising a plurality of record holders pivotally mounted for movement normal to the axis of rotation of records held therein and means in each record holder for rotatably supporting a record on its peripheral edge, a pair of tone arms including tone pick-ups thereon each mounted for movement parallel to the axis of rotation of records held in said record holders and adapted to follow the sound groove in a record when placed in playing contact thereagainst, means responsive to manual pre-selection for moving any one or more of the record holders and the records carried thereby sequentially into one or the other of two playing positions, means for moving one or the other of the said tone arms into juxtaposition with respect to one side or the other of a record carried by any record holder when moved to one or the other of the said playing positions, means for rotating the record carried by any record holder when moved into either playing position, and means for placing the tone pick-up of the tone arm juxtaposed to the rotating record in playing contact thereagainst.

7. In an automatic phonograph, the combination of a record magazine comprising a plurality of record holders pivotally mounted for movement normal to the axis of rotation of records held therein and adapted to be tilted into one or the other of two playing positions, a tone arm including a tone pick-up thereon mounted for movement parallel to the axis of rotation of records held in said record holders and adapted to be moved into juxtaposition with respect to one side of a record carried by any record holder by the tilting of the record holder into one playing position, another tone arm including a tone pick-up thereon mounted for movement parallel to the axis of rotation of records held in said record holders and adapted to be moved into juxtaposition with respect to the other side of a record carried by any record holder by the tilting of the record holder into the other playing position, means for tilting any record holder into either playing position, means in each record holder for rotatably supporting a record on its peripheral edge, means for rotating a record carried by any record holder when tilted into either playing position, and means for placing the tone pick-up of the tone arms juxtaposed to the rotating record in playing contact thereagainst.

8. In an automatic phonograph, the combination of a record magazine comprising a plurality of record holders pivotally mounted for movement normal to the axis of rotation of records held therein and adapted to be tilted into one or the other of two playing positions, a tone arm including a tone pick-up thereon mounted for movement parallel to the axis of rotation of records held in said record holders and adapted to be moved into juxtaposition with respect to one side of a record carried by any record holder by the tilting of the record holder into one playing position, another tone arm including a tone pick-up thereon mounted for movement parallel to the axis of rotation of records held in said record holders and adapted to be moved into juxtaposition with respect to the other side of a record carried by any record holder by the tilting of the record holder into the other playing position, means responsive to manual pre-selection for tilting any one or more of the record holders sequentially into either playing position, means in each record holder for rotatably supporting a record on its peripheral edge, means for rotating a record carried by any record holder when tilted into either playing position, and means for placing the tone pick-up of the tone arm juxtaposed to the rotating record in playing contact thereagainst.

9. In an automatic phonograph, the combination of a record magazine comprising a plurality of record holders pivotally mounted for movement normal to the axis of rotation of records held therein and adapted to be tilted into one or the other of two playing positions, means for maintaining the said record holders yieldably neutral with respect to their playing positions, a pair of tone arms including tone pick-ups thereon each mounted for movement parallel to the axis of rotation of records held in said record holders and adapted to be placed in juxtaposition with one side or the other of a record carried by any record holder responsive to the tilting of the record holder into one or the other of the said two playing positions, means for tilting any record holder into either playing position, means in each record holder for rotatably supporting a record on its peripheral edge, means for rotating a record carried by any record holder when tilted into either playing position, and means for placing the tone pick-up of the tone arm juxtaposed to the rotating record in playing contact thereagainst.

10. In an automatic phonograph, the combination of a record magazine comprising a plurality of record holders pivotally mounted for movement normal to the axis of rotation of records held therein and adapted to be tilted into one or the other of two playing positions, means for maintaining the said record holders yieldably neutral with respect to their playing positions, a pair of record holder tilting levers linked to each record holder adapted to tilt the said record holder into one or the other of its two playing positions, means in each record holder for rotatably supporting a record on its peripheral edge, means for rotating a record carried by any record holder when tilted into either playing position, a pair of tone arms including tone pick-ups thereon each mounted for movement parallel to the axis of rotation of records held in said record holders and adapted to be placed in playing contact with one side or the other of a record carried by any record holder responsive to the tilting of the record holder into one or the other of the said two playing positions, and means for actuating any one of the said record holder tilting levers whereby to tilt the corresponding record holder into its corresponding playing position.

11. In an automatic phonograph, the combination of a record magazine comprising a plurality of record holders pivotally mounted for movement normal to the axis of rotation of records held therein and adapted to be tilted into one or the other of two playing positions, means for maintaining the said record holders yieldably neutral with respect to their playing positions, a pair of record holder tilting levers linked to each record holder adapted to tilt the said record holder into one or the other of its two playing positions, means in each record holder for rotatably supporting a record on its peripheral edge, means for rotating a record carried by any record holder when tilted into either playing position, a pair of tone arms including tone pick-ups thereon each mounted for movement parallel to the axis of rotation of records held in said record holders and adapted to be placed in playing contact with one side or the other of a record carried by any record holder responsive to the tilting of the record holder into one or the other of the said two playing positions, and means responsive to manual pre-selection for actuating any one of the said record holder tilting levers whereby to tilt the corresponding record holder into its corresponding playing position.

12. In an automatic phonograph, the combination of a record magazine comprising a plurality of record holders, a pair of record supporting means journaled in each record holder on which a record placed on its peripheral edge in a record holder may rotate, means for mounting each record holder movable independent of the others into one of two playing positions, means adapted to engage the peripheral edge of a record positioned in any record holder and rotate the record when the said record holder is moved into either playing position, tone pick-up means mounted for movement parallel to the axis of rotation of records held in said record holder, means for bringing said tone pick-up means into playing contact against a selected record when rotating in a selected playing position, and means responsive to manual pre-selection for moving any record into either playing position.

13. In an automatic phonograph, the combination of a record magazine comprising a plurality of normally vertically disposed generally Y-shaped record holders, a common shaft upon which said record holders are tiltably mounted, an idler roll supported on each fork of the said Y-shaped record holders adapted to rotatably carry a record centrally therein, a constantly running record driving roll disposed on each side of the said record magazine parallel to the said record holder mounting shaft each adapted to engage and rotate a record carried by any record holder when tilted into one of two playing positions, and means for tilting any record holder into either playing position.

14. In an automatic phonograph, the combination of a record magazine comprising a plurality of normally vertically disposed generally Y-shaped record holders, a common shaft upon which said record holders are tiltably mounted, an idler roll rotatably supported on each fork of the said Y-shaped record holders, a V-grooved peripheral facing on each idler roll adapted to carry a record centrally therein, a constantly running record driving roll disposed on each side of the said record magazine parallel to the said record holder mounting shaft, facing on each driving roll having a V-groove therein disposed opposite the V-groove in each idler roll facing, each driving roll being so located as to be engaged by and rotate a record carried by any record holder when tilted into one of two playing positions, and means for tilting any record holder into either playing position.

15. In an automatic phonograph, the combination of a record magazine comprising a plurality of record holders, means in each record holder for rotatably supporting a record on its peripheral edge, means upon which the said record holders are movably mounted independently of each other, spring means for yieldably holding each record holder in a neutral position secured to each record holder and anchored in fixed relationship to said record holder mounting means, means for moving each record holder into either one of two playing positions, and rotating means against which the periphery of a record carried by any record holder contacts when moved into either playing position.

16. In an automatic phonograph, the combination of a record magazine comprising a plurality of record holders, means in each record holder for rotatably supporting a record on its peripheral edge, a common shaft upon which the said record holders are tiltably mounted, spring means for yieldably holding each record holder in a neutral position mounted on each record holder and anchored in fixed relationship to but spaced from the said common shaft, means for tilting each record holder into either one of two playing positions, and rotating means against which the periphery of a record carried by any record holder contacts when moved into either playing position.

17. In an automatic phonograph, the combination of a record magazine comprising a plurality of record holders, a common shaft upon which the said record holders are tiltably mounted, a pin journaled through each record holder parallel to and adjacent the common shaft upon which the said record holder is tiltably mounted, a sleeve fixed diametrically through said pin, a fixed anchorage shaft disposed parallel to and adjacent the said common shaft upon which the said record holders are tiltably mounted, an anchorage rod telescoped through said sleeve and pivotally connected to said anchorage shaft, compression springs telescoped on said anchorage rod each side of said sleeve adapted to apply pressure against said sleeve and hold said record holder yieldably in a neutral position, means on said anchorage rod against which the said compression springs react adjustable with respect to the said sleeve for regulating and equalizing the spring pressure applied to the said record holder, and means for tilting each record holder into either one of two playing positions.

18. In an automatic phonograph, the combination of a record magazine comprising a plurality of record holders, a common shaft upon which the said record holders are tiltably mounted, means for yieldably maintaining each record holder in a neutral position from which it may be tilted into either one of two playing positions, a pair of tilting levers for each record holder, a selector plunger adapted to be brought in registry with any record holder tilting lever, a link connecting each record holder to its pair of tilting levers, a fulcrum for each tilting lever, the fulcrum of one lever of each pair of tilting levers being located to permit the selector plunger to tilt the record holder connected thereto in one direction into one playing position, the fulcrum of the other lever of each pair of tilting levers being located to permit the selector plunger to tilt the record holder connected thereto in the other direction into its other playing position, and means for actuating the selector plunger when in registry with either tilting lever of any pair of tilting levers whereby to tilt the corresponding record holder into either of its two playing positions.

19. In an automatic phonograph, the combination of a record magazine comprising a plurality of record holders, a common shaft upon which the said record holders are tiltably mounted, means for yieldably maintaining each record holder in a neutral position from which it may be tilted into either one of two playing positions, a pair of tilting levers for each record holder, a selector plunger adapted to be brought in registry with any record holder tilting lever, a link connecting each record holder to its pair of tilting levers, a fulcrum for each tilting lever, the fulcrum of one lever of each pair of tilting levers being located to permit the selector plunger to tilt the record holder connected thereto in one direction into one playing position, the fulcrum of the other lever of each pair of tilting levers being located to permit the selector plunger to tilt the record holder connected thereto in the other direction into its other playing position, means for moving the selector plunger sequentially in response to manual pre-selection into registry with any record holder tilting lever, and means for actuating the selector plunger when placed in registry with any record holder tilting lever whereby to tilt the corresponding record holder into one or the other of its playing positions.

20. In an automatic phonograph, the combination of a record magazine comprising a plurality of record holders, a common shaft upon which the said record holders are tiltably mounted, means for yieldably maintaining each record holder in a neutral position from which it may be tilted into either one of two playing positions, a pair of tilting levers for each record holder, a fulcrum for each tilting lever, the fulcrum of one lever of each pair of tilting levers being located to permit a tilting lever actuating means to tilt the record holder connected thereto in one direction into one playing position, the fulcrum of the other lever of each pair of tilting levers being located to permit the said tilting lever actuating means to tilt the record holder connected thereto in the other direction into its other playing position, one of the said tilting levers being provided with a slotted aperture at its pivotal connection to the said link connecting each pair of tilting levers to each record holder whereby to compensate for the difference in location of the fulcrums of the tilting levers of each pair of tilting levers, and means for actuating either tilting lever of any pair of tilting levers whereby to tilt the corresponding record holder into either of its two playing positions.

21. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrummed at different points with respect to the means employed for actuating the same whereby to permit each tilting lever of a pair of tilting levers to tilt the record holder linked thereto into one of its two playing positions, a link pivotally connecting each record holder to its pair of tilting levers, and means for actuating either tilting lever of any pair of tilting levers whereby to tilt the record holder connected thereto into either of its two playing positions.

22. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrummed at different points with respect to the means employed for actuating the same whereby to permit each tilting lever of a pair of tilting levers to tilt the record holder linked thereto into one of its two playing positions, a link pivotally connecting each record holder to its pair of tilting levers, and means movable into registry with any record holder tilting lever in response to manual pre-selection for actuating any one or more of the said tilting levers sequentially whereby to tilt the corresponding record holders into one or the other of their playing positions.

23. In an automatic phonograph, the combination of a record magazine comprising a plurality of record holders, a common shaft upon which the said record holders are tiltably mounted, means for yieldably maintaining each record holder in a neutral position from which it may be tilted into either one of two playing positions, a tone arm carriage track on each side of the said record magazine disposed parallel to the common shaft upon which the record holders are tiltably mounted, a mobile tone arm carriage mounted on each track, means for yieldably maintaining each tone arm carriage central with respect to the said record magazine, a pair of curved guides on each tone arm carriage, a roller cam journaled on each side of each record holder positioned to engage and follow a tone arm carriage guide of one or the other of the said tone arm carriages during the tilting of any record holder into either one or the other of its two playing positions whereby to move one or the other of the said tone arm carriages central with respect to the tilted record holder, and means for tilting any record holder into either of its two playing positions.

24. In an automatic phonograph, the combination of a record magazine comprising a plurality of record holders, a common shaft upon which the said record holders are tiltably mounted, means for yieldably maintaining each record holder in a neutral position from which it may be tilted into either one of two playing positions, a tone arm carriage track on each side of the said record magazine disposed parallel to the common shaft upon which the record holders are tiltably mounted, a mobile tone arm carriage mounted on each track, means for yieldably maintaining each tone arm carriage central with respect to the said record magazine, a pair of curved guides on each tone arm carriage, a roller cam journaled on each side of each record holder positioned to engage and follow a tone arm carriage guide of one or the other of the said tone arm carriages during the tilting of any record holder into either one or the other of its two playing positions whereby to move one or the other of the said tone arm carriages central with respect to the tilted record holder, and means responsive to manual pre-selection for tilting any record holder into either of its two playing positions.

25. In an automatic phonograph, the combination of a record magazine comprising a plurality of record holders, a common shaft upon which the said record holders are tiltably mounted, means for yieldably maintaining each record holder in a neutral position from which it may be tilted into either one of two playing positions, a tone arm carriage track on each side of the said record magazine disposed parallel to the common shaft upon which the record holders are tiltably mounted, a mobile tone arm carriage mounted on each track, means for yieldably maintaining each tone arm carriage central with respect to the said record magazine, a pair of curved guides on each tone arm carriage, a roller cam journaled on each side of each record holder positioned to engage and follow a tone arm carriage guide of one or the other of the said tone arm carriages during the tilting of any record holder into either one or the other of its two playing positions whereby to move one or the other of the said tone arm carriages central with respect to the tilted record holder, a tone arm including a tone pick-up thereon mounted on each tone arm carriage adjacent the center thereof disposed in opposite directions with respect to each other located to become juxtaposed to one side or the other of a record carried by any record holder when the record holder is tilted into one or the other of its two playing positions, and means for tilting any record holder into either of its two playing positions.

26. In an automatic phonograph, the combination of a record magazine comprising a plurality of record holders mounted for movement normal to the axis of rotation of records held therein and adapted to be moved in one or the other of two playing positions, a tone arm carriage track fixed in spaced relationship on each side of the said record magazine parallel thereto, a mobile tone arm carriage mounted on each track adapted to be yieldably maintained central with respect to the record magazine, a tone arm including a tone pick-up thereon mounted on each tone arm carriage adjacent the center thereof disposed in opposite directions with respect to each other whereby to become juxtaposed to one side or the other of a record carried by any record holder when the record holder is moved into one of its two playing positions, a pair of guides mounted on each tone arm carriage, cam means on each record holder adapted to engage one of the guides mounted on each tone arm carriage and move the said tone arm carriage together with the tone arm and tone pick-up thereon into playing position with respect to one of the two sides of a record carried by any record holder when any record holder is moved into one or the other of its two playing positions, and means for moving any record holder into either of its two playing positions.

27. In an automatic phonograph, the combination of a record magazine comprising a plurality of record holders pivotally mounted for movement normal to the axis of rotation of records held therein and including means in each record holder for rotatably supporting a record on its peripheral edge, means for resiliently maintaining said record holders in a neutral position and means for tilting each record holder independently of the others in either one of two playing positions, a pair of tone arm carriages one disposed on each side of said record magazine central with respect thereto, a tone arm including a tone pick-up mounted on each tone arm carriage adjacent the center thereof faced in opposite directions with respect to each other, means on each record holder adapted to engage one or the other of the said tone arm carriages and move one of the said tone arm carriages central with respect thereto during the tilting thereof into one or the other of its two playing positions whereby to place the tone arm of the particular tone arm carriage moved into juxtaposition with respect to one side or the other of a record carried by the tilted record holder, means for rotating a record carried by any record holder when tilted into either playing position, means for moving the tone arm juxtaposed to the rotating record toward the said rotating record whereby to place the tone pick-up thereof in playing contact against said record, the said tone arm being adapted to follow the spiral sound grooves of the record during the playing thereof.

28. In an automatic phonograph, the combination of a record magazine comprising a plurality of record holders pivotally mounted for movement normal to the axis of rotation of records held therein and adapted to be tilted into one or the other of two playing positions, a mobile tone arm carriage disposed on each side of the said record magazine, a tone arm centering device connected to each tone arm carriage adapted to yieldably maintain each tone arm carriage in a neutral central position with respect to the said record magazine guide, means on each tone arm carriage engageable by one of the said record holders when tilted into one or the other of its two playing positions and moved thereby central with respect thereto, a tone arm including a tone pick-up thereon mounted on each tone arm carriage adjacent the center thereof facing the center thereof, each tone arm and pick-up being oppositely disposed with respect to the other whereby to admit of one tone arm and pick-up being placed in juxtaposition to one side of a record carried by any record holder when one tone arm carriage is moved thereby central with respect thereto and to admit of the other tone arm and pick-up being placed in juxtaposition to the other side of a record carried by any record holder when the other tone arm carriage is moved thereby central with respect thereto, means for tilting any record holder into either playing position, means in each record holder for rotatably supporting a record on its peripheral edge, means for rotating a record carried by any record holder when tilted into either playing position, and means for placing the tone pick-up of the tone arm juxtaposed to the rotating record in playing contact thereagainst.

29. In an automatic phonograph, the combination of a record magazine comprising a plurality of record holders pivotally mounted for movement normal to the axis of rotation of records held therein and adapted to be tilted into one or the other of two playing positions, a mobile tone arm carriage disposed on each side of the said record magazine, a tone arm centering device connected to each tone arm carriage adapted to yieldably maintain each tone arm carriage in a neutral central position with respect to the said record magazine, guide means on each tone arm carriage engageable by one of the said record holders when tilted into one or the other of its two playing positions and moved thereby central with respect thereto, a tone arm including a tone pick-up thereon mounted on each tone arm carriage adjacent the center thereof facing the center thereof, each tone arm and pick-up being oppositely disposed with respect to the other whereby to admit of one tone arm and pick-up being placed in juxtaposition to one side of a record carried by any record holder when one tone arm carriage is moved thereby central with respect thereto and to admit of the other tone arm and pick-up being placed in juxtaposition to the other side of a record carried by any record holder when the other tone arm carriage is moved thereby central with respect thereto, means responsive to manual pre-selection for tilting any one or more of the record holders sequentially into either playing position, means in each record holder for rotatably supporting a record on its peripheral edge, means for rotating a record carried by any record holder when tilted into either playing position, and means for placing the tone pick-up of the tone arm juxtaposed to the rotating record in playing contact thereagainst.

30. In an automatic phonograph, the combination of a record magazine comprising a plurality of record holders pivotally mounted for movement normal to the axis of rotation of records held therein and yieldably maintained in a neutral position and adapted to be tilted into one or the other of two playing positions, a mobile tone arm carriage disposed normally central on each side of the said record magazine adapted to be moved central with respect to any record holder by the tilting thereof into one or the other of its playing positions, and a tone arm carriage centering device for each tone arm carriage adapted to yieldably maintain each tone arm carriage normally central with respect to the said record magazine whereby to return the tone arm carriage back to its central position with respect to the said record magazine when the record holder moving the same is returned to its neutral position.

31. In an automatic phonograph, the combination of a record magazine comprising a plurality of record holders pivotally mounted for movement normal to the axis of rotation of records held therein and including means for yieldably maintaining the same in a neutral position adapted to be tilted into one or the other of two playing positions, a mobile tone arm carriage disposed on each side of the said record magazine adapted to be moved central with respect to any record holder by the tilting thereof into one or the other of its playing positions normally centered with respect to the said record magazine, a centering device for each tone arm carriage adapted to yieldably maintain its tone arm carriage central with respect to the said record magazine composed of a circular drum journaled in a suitably disposed fixed position with respect thereto, means connecting the centering drum to the said tone arm carriage adapted to rotate the said centering drum from its normal position when the said tone arm carriage is moved from its central position with respect to the said record magazine, resilient centering means adapted to constantly urge the said drum to rotate back to its normal position whereby to bring the said tone arm carriage back to its central position with respect to the said record magazine when the record holder moving the same is returned to its neutral position.

32. In an automatic phonograph, the combination of a record magazine comprising a plurality of record holders pivotally mounted for movement normal to the axis of rotation of records held therein and adapted to be tilted into one or the other of two playing positions, a mobile tone arm carriage disposed on each side of the said record magazine normally centered with respect to the said record magazine, a centering device for each tone arm carriage adapted to yieldably maintain its tone arm carriage central with respect to the said record magazine composed of a centering drum journaled in a suitably disposed fixed position with respect thereto, a centering cable connected to each end of the tone arm carriage wrapped around the said centering drum whereby to cause the said centering drum to rotate when the tone arm carriage is moved from its normal central position with respect to the said record magazine, a centering bar pivotally connected to the said centering drum eccentric with respect to the center thereof; a tension spring anchorage resiliently maintaining the center of the said centering drum, the said anchorage bar and its pivotal connection to the said centering drum being in alignment when the tone arm carriage is centered with respect to the said record magazine; the said centering bar having a longitudinally disposed slot therein, a fixed centering bar guide disposed through said slot in said centering bar serving as a pivot around which the said centering bar is raised and pivoted when the said centering drum is rotated in either direction.

33. In an automatic phonograph, the combination of a record magazine comprising a plurality of record holders pivotally mounted for movement normal to the axis of rotation of records held therein and adapted to be tilted into one or the other of two playing positions, a mobile tone arm carriage disposed on each side of the record magazine each adapted to be moved by the tilting of any record holder into one or the other of its playing positions central with respect to the said record holder, a tone arm including a tone pick-up thereon normally disposed adjacent the center of the said tone arm carriage facing the record carried by the tilted record holder, a parallelogram type mounting means on said tone arm carriage including a longitudinally disposed pivot on which the said tone arm is pivotally supported to pivot parallel to the face of the record carried by the said record holder responsive to the tone pick-up thereof following the spiral sound groove in the face of the said record, a tone arm supporting lever extending rigidly from said parallelogram type tone arm mounting means, an arcuately movable paddle-like tone arm positioning lever independent of each tone arm carriage disposed parallel to the travel of each tone arm carriage and below the said tone arm supporting lever of the said parallelogram type tone arm mounting means, spring means for maintaining the said tone arm supporting lever in contact against the said arcuately movable lever whereby to maintain the said tone pick-up in its normal position, means for moving the said arcuate tone arm positioning lever whereby to move the said tone arm toward the center of the said tone arm carriage and place the tone pick-up thereon in playing contact in the sound groove of the record carried by the tilted record holders, a second pivot normal to said first mentioned pivot on said parallelogram type tone arm mounting including spring loaded means adapted to provide resilient pivotal limited movement normal with respect to the face of a record when the tone pick-up thereon is placed in playing contact thereagainst means in each record holder for rotatably supporting a record on its peripheral edge, and means for rotating any record carried by any record holder when tilted into either of its playing positions.

34. In an automatic phonograph, the combination of a record magazine comprising a plurality of record holders pivotally mounted for movement normal to the axis of rotation of records held therein and adapted to be tilted into playing position on one side or the other of the record magazine, means in each record holder for rotatably supporting a record on its peripheral edge, means for rotating a record carried by any record holder when tilted into either playing position, a pair of mobile tone arm carriages including a tone arm and tone pick-up thereon one located on each side of the said record magazine adapted to be moved by the tilting of any record holder and carry the tone arm and pick-up thereon into juxtaposition with respect to one side or the other of a record carried by the said record holder into one or the other of its playing positions, mounting means on said tone arm carriage to permit the said tone arm to be moved toward the record after being juxtaposed thereto adapted to pivotally support the said tone arm to pivot parallel to the face of the record carried by the said record holder responsive to the tone pick-up thereof following the spiral sound grooves in the face of the said record, means for moving any record holder into either of its playing positions, and means for moving the tone arm juxtaposed to any rotating record toward the said rotating record whereby to place the tone pick-up on the said tone arm in playing contact thereagainst.

35. In an automatic phonograph, the combination of a record magazine comprising a plurality of record holders pivotally mounted for movement normal to the axis of rotation of records held therein and adapted to be tilted into playing position on one side or the other of the record magazine, a pair of mobile tone arm carriages including a tone arm and tone pick-up thereon one located on each side of the said record magazine adapted to be moved by the tilting of any record holder and carry the tone arm and pick-up thereon into juxtaposition with respect to one side or the other of a record carried by the said record holder into one or the other of its playing positions, each tone arm being mounted on its carriage to be moved toward a record and pivoted parallel to the face of the record after being juxtaposed thereto, means for moving any record holder into either of its playing positions, means in each record holder for rotatably supporting a record on its peripheral edge, means for rotating a record carried by any record holder when tilted into either playing position, and means for moving the tone arm juxtaposed to the rotating record toward the said record whereby to place the tone pick-up on the said tone arm in playing contact thereagainst.

36. In an automatic phonograph, the combination of a record magazine comprising a plurality of record holders pivotally mounted for movement normal to the axis of rotation of records held therein and adapted to be tilted into playing position on one side or the other of the record magazine, a pair of mobile tone arm carriages including a tone arm and tone pick-up thereon one located on each side of the said record magazine adapted to be moved by the tilting of any record holder and carry the tone arm and pick-up thereon into juxtaposition with respect to one side or the other of a record carried by the said record holder into one or the other of its playing positions, a parallelogram type mounting on each tone arm carriage including a bearing cantilevered therefrom, an arcuate tone arm positioning lever independent of the said tone arm carriage disposed parallel to the travel thereof, spring means constantly urging the said bearing in contact against said tone arm positioning lever, a bi-directional pivot block on which the said tone arm is pivotally mounted for pivotal movement normal to the face of a record, a stop integral with said pivot block adapted to limit the pivotal movement of the said tone arm toward the face of the record, spring means yieldably securing said tone arm to said stop adapted to permit said tone arm to pivot away from the face of a record when the tone pick-up on the said tone arm is placed thereagainst, the said bi-directional pivotal block including the tone arm pivotally mounted thereon being pivoted on the said parallelogram type mounting whereby to permit the tone arm to follow the sound grooves in the face of a record when the tone pick-up on the said tone arm is placed thereagainst, means for actuating the said arcuate tone arm positioning lever whereby to move the said tone arm toward the record adjacent which it is juxtaposed and place the tone pick-up thereon in playing position against the said record, a counterweight on said bi-directional pivot block adapted to return the tone arm to its normal position when the tone arm positioning lever is returned to its normal position after the playing of all or any part of a record.

37. In an automatic phonograph, the combination of a record magazine comprising a plurality of record holders pivotally mounted for movement normal to the axis of rotation of records held therein and adapted to be tilted into playing position on one side or the other of the record magazine, a pair of mobile tone arm carriages including a tone arm and tone pick-up thereon one located on each side of the said record magazine adapted to be moved by the tilting of any record holder and carry the tone-arm and pick-up thereon into juxtaposition with respect to one side or the other of a record carried by the said record holder into one or the other of its playing positions, means for mounting each tone arm on its carriage to enable the said tone arm to be moved toward a record and pivoted parallel to the face of the record after being juxtaposed thereto, means for moving any record holder into either of its playing positions, means in each record holder for rotatably supporting a record on its peripheral edge, means for rotating a record carried by any record holder when tilted into either playing position, means for moving the tone arm juxtaposed to the rotating record toward the said record whereby to place the tone pick-up on the said tone arm in playing contact thereagainst, and pivot means on said tone arm mounting means adapted to provide the said tone arm with resilient pivotal limited movement normal with respect to the face of a record when the tone pick-up thereon is placed in playing contact thereagainst.

38. In an automatic phonograph, the combination of a record magazine comprising a plurality of record holders pivotally mounted for movement normal to the axis of rotation of records held therein and adapted to be tilted into playing positions on one side or the other of the record magazine, a pair of mobile tone arm carriages including a tone arm and tone pick-up thereon one located on each side of the said record magazine adapted to be moved by the tilting of any record holder and carry the tone arm and pick-up thereon into juxtaposition with respect to one side or the other of a record carried by the said record holder into one or the other of its playing positions, means for mounting each tone arm on its carriage to enable the said tone arm to be moved toward a record and pivoted parallel to the face of the record after being juxtaposed thereto, means responsive to manual pre-selection for moving any record holder into either of its playing positions, means in each record holder for rotatably supporting a record on its peripheral edge, means for rotating a record carried by any record holder when tilted into either playing position, means for moving the tone arm juxtaposed to the rotating record toward the said record whereby to place the tone pick-up on the said tone arm in playing contact thereagainst, and pivot means on said tone arm mounting means adapted to provide the said tone arm with resilient pivotal limited movement normal with respect to the face of a record when the tone pick-up thereon is placed in playing contact thereagainst.

39. In an automatic phonograph, the combination of a record magazine comprising a plurality of record holders pivotally mounted for movement normal to the axis of rotation of records held therein and adapted to be tilted into playing positions on one side or the other of the record magazine, a pair of mobile tone arm carriages including a tone arm and tone pick-up thereon one located on each side of the said record magazine adapted to be moved by the tilting of any record holder and carrying the tone arm and pick-up thereon into juxtaposition with respect to one side or the other of a record carried by the said record holder into one or the other of its playing positions, means for mounting each tone arm on its carriage to enable the said tone arm to be moved toward a record and pivoted parallel to the face of the record after being juxtaposed thereto, cam actuated means positioned automatically responsive to manual preselection for moving any record holder into either of its playing positions, means in each record holder for rotatably supporting a record on its peripheral edge, means for rotating a record carried by any record holder when titled into either playing position, cam means for moving the tone arm juxtaposed to the rotating record toward the said record whereby to place the tone pick-up on the said tone arm in playing contact thereagainst, and pivot means on said tone arm mounting means adapted to provide the said tone arm with resilient pivotal limited movement normal with respect to the face of a record when the tone pick-up thereon is placed in playing contact thereagainst.

40. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrumed at different points with respect to the means employed for actuating the same whereby to permit each tilting lever of a pair of tilting levers to tilt the record holder linked thereto into one of its two playing positions, a link pivotally connecting each record holder to its pair of tilting levers, one or more selector plungers, a stop on each selector plunger, normally continuously running chains carrying said selector plungers one at a time past the said record holder tilting levers, a selector push rod and stop assembly for each record holder tilting lever including means for normally maintaining the push rod thereof in its unselected or "out" and its selected or "in" positions, the said push rods being adapted to be pushed manually to their selected or "in" position wherein the stop thereof becomes placed in operative alignment with the stops of the moving selector plungers whereby to arrest a selector plunger and hold the same in alignment with the corresponding record holder tilting lever, a selector plunger operating lever located coextensive with respect to the said record holder tilting levers adapted to actuate the selector plunger wherever stopped and cause the same to tilt the selected record holder into its selected position, means in each record holder for rotatably supporting a record on its peripheral edge, and means for rotating a record carried by any record holder when tilted into either playing position.

41. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrumed at different points with respect to the means employed for actuating the same whereby to permit each tilting lever of a pair of tilting levers to tilt the record holder linked thereto into one of its two playing positions, a link pivotally connecting each record holder to its pair of tilting levers, one or more spring loaded selector plungers, a stop on each selector plunger, normally continuously running chains carrying said selector plungers one at a time past the said record holder tilting levers, a selector push rod and stop assembly for each record holder tilting lever including means for normally maintaining the push rod thereof in its unselected or "out" and its selected or "in" positions, the said push rods being adapted to be pushed manually to their selected or "in" position wherein the stop thereof becomes placed in operative alignment with the stops of the moving selector plungers whereby to arrest a selector plunger and hold the same in alignment with the corresponding record holder tilting lever, a selector plunger operating lever located coextensive with respect to the said record holder tilting levers adapted to actuate the selector plunger wherever stopped and cause the same to tilt the selected record holder into its selected position, a selector plunger operating cam adapted to actuate said selector plunger operating lever, an annular stop on said selector plungers, a click on each push rod and stop assembly adapted to be engaged by the said annular stop on said selector plungers during their return to normal position upon release by said selector plunger operating cam and return the push rod which arrested the selector plunger to its unselected or "out" position, means in each record holder for rotatably supporting a record on its peripheral edge, and means for rotating a record carried by any record holder when tilted into either playing position.

42. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrumed at different points with respect to the means employed for actuating the same whereby to permit each tilting lever of a pair of tilting levers to tilt the record holder linked thereto into one of its two playing positions, a link pivotally connecting each record holder to its pair of tilting levers, one or more selector plungers, continuously traveling means carrying said selector plungers one at a time past said record holder tilting levers, a stop means for each record holder tilting lever adapted to be placed responsive to manual pre-selection into the path of the said traveling selector plungers whereby to arrest the travel thereof and position a selector plunger in operative alignment with the corresponding record holder tilting lever, and means for actuating said selector plunger, when arrested in operative alignment with a tilting lever whereby to tilt the corresponding record holder into the selected playing position.

43. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrumed at different points with respect to the means employed for actuating the same whereby to permit each tilting lever of a pair of tilting levers to tilt the record holder linked thereto into one of its two playing positions, a link pivotally connecting each record holder to its pair of tilting levers, one or more selector plungers, continuously traveling means carrying said selector plungers one at a time past said record holder tilting levers, a stop means for each record holder tilting lever adapted to be placed responsive to manual pre-selection into the path of the said traveling selector plungers whereby to arrest the travel thereof and position a selector plunger in operative alignment with the corresponding record holder tilting lever, means responsive to cam means for actuating said selector plunger when arrested in operative alignment with a tilting lever whereby to tilt the corresponding record holder into the selected playing position, spring means in the housing of the said selector plunger adapted to return the same to its normal position after being actuated, and means on each stop means adapted to be engaged by a selector plunger during its return to its normal position whereby to return the stop means to its normal position.

44. In an automatic phonograph, the combination of a record magazine comprising a plurality of record holders pivotally mounted for movement normal to the axis of rotation of records held therein and each adapted to be tilted independently of each other into one of two playing positions on opposite sides of the record magazine from a neutral position, spring means for yieldably maintaining each record holder in its neutral position, a pair of tilting levers for each record holder fulcrumed at different points with respect to the means employed for actuating the same whereby to permit each tilting lever of a pair of tilting levers to tilt the record linked thereto into one of its two playing positions, a link pivotally connecting each record holder to its pair of tilting levers, one or more selector plungers, continuously traveling means carrying said selector plungers one at a time past the said record holder tilting levers, a stop means for each record holder tilting lever adapted to be placed responsive to manual pre-selection into the path of the said traveling selector plungers whereby to arrest the travel thereof and position the arrested selector plunger in operative alignment with the corresponding record holder tilting lever, a selector plunger operating lever, selector plunger operating cam means for actuating the said selector plunger operating lever when a selector plunger is arrested in operative alignment with a tilting lever whereby to tilt the corresponding record holder into the selected playing position, spring means for returning said selector plunger operating lever to its normal position upon release by said selector plunger operating cam, spring means in the housing of the said selector plunger adapted to return the said selector plunger to its normal position after being actuated whereupon the said spring means for maintaining the record holder in its neutral position returns the tilted record holder and its tilting levers linked thereto to their neutral position, means on the said selector plunger stop means adapted to be engaged by the said selector plunger and return the said stop means to its normal position during the return of the said selector plunger to its normal position whereupon the said selector plungers are again permitted to travel until another stop manually placed in the path of travel of the said selector plungers is encountered, a pair of mobile tone arm carriages including a tone arm and tone pick-up thereon one located on each side of the record magazine adapted to be moved by the tilting of any record holder and carry the tone pick-up thereon into juxtaposition with respect to one side or the other of a record carried by the said record holder into one or the other of its playing positions, a parallelogram type mounting means on said tone arm carriage on which the said tone arm is pivotally supported to pivot parallel to the face of the record carried by the said record holder responsive to the tone pick-up thereof following the spiral sound groove in the face of the said record, a tone arm supporting lever extending rigidly from said parallelogram type tone arm mounting means, an arcuately movable paddle-like tone arm positioning lever independent of each tone arm carriage disposed parallel to the travel of each tone arm carriage and below the said tone arm supporting lever of the said parallelogram type tone arm mounting means, spring means for maintaining the said tone arm supporting lever in contact against the said arcuately movable lever whereby to maintain the said tone pick-up in its normal position, cam means for moving the said arcuate tone arm positioning lever whereby to move the said tone arm toward the center of the said tone arm carriage and place the said tone pick-up in playing contact in the sound groove of the record carried by the tilted record holders, pivot means on said tone arm mounting means adapted to provide the said tone arm with resilient pivotal limited movement normal with respect to the face of a record when the tone pick-up thereon is placed in playing contact thereagainst, means in each record holder for rotatably supporting a record on its peripheral edge, and means for rotating any record carried by any record holder when tilted into either of its playing positions.

45. In an automatic phonograph, the combination of a record magazine comprising a plurality of record holders pivotally mounted for movement normal to the axis of rotation of records held therein and including means for tilting their same independently of each other from their neutral position into one of two playing positions, means for yieldably maintaining each record holder in its neutral position, a selector plunger, means responsive to manual pre-selection for positioning said selector plunger in operating relationship with respect to a record holder tilting means, a record selector plunger operating cam adapted through intermediate means to tilt any selected record holder into either playing position, means in each record holder for rotatably supporting a record on its peripheral edge, means for rotating a record carried by any record holder when tilted into either playing position, a pair of tone arms including a tone pick-up thereon each mounted for movement parallel to the axis of rotation of records held in said record holder and adapted to be moved from their neutral position into juxtaposition with one side or the other of a record carried by any record holder responsive to the tilting of the record holder into one or the other of the said two playing positions, the said tone arms being pivoted to follow the spiral sound groove of a record when the tone pick-up thereof is placed thereagainst, means for yieldably maintaining the said tone arms in their neutral position, a tone arm placing cam adapted through intermediate means to place the tone pick-up of the tone arm juxtaposed to the rotating record into playing contact thereagainst, and means for rotating said cams first to tilt the selected record holder and place said tone arm automatically in response to manual pre-selection and second to release said tone arm and record holder in response to the completion of playing of a selection.

46. In an automatic phonograph, the combination of a record magazine comprising a plurality of record holders pivotally mounted for movement normal to the axis of rotation of records held therein and including means for tilting the same independently of each other from their neutral position into one of two playing positions, means for yieldably maintaining each record holder in its neutral position, a selector plunger, means responsive to manual pre-selection for positioning said selector plunger in operating relationship with respect to a record holder tilting means, a record selector plunger operating cam adapted through intermediate means to tilt any selected record holder into either playing position, means in each record holder for rotatably supporting a record on its peripheral edge, means for rotating a record carried by any record holder when tilted into either playing position, a pair of tone arms including a tone pick-up thereon each mounted for movement parallel to the axis of rotation of records held in said record holder and adapted to be moved from their neutral position into juxtaposition with one side or the other of a record carried by any record holder responsive to the tilting of the record holder into one or the other of the said two playing positions, the said tone arms being pivoted to follow the spiral sound groove of a record when the tone pick-up thereof is placed thereagainst, means for yieldably maintaining the said tone arms in their neutral position, a tone arm placing cam adapted through intermediate means to place the tone pick-up of the tone arm juxtaposed to the rotating record into playing contact thereagainst, each of the said cams having a dwell to permit the holding of the said record selector plunger and tone arms to rest in their operated positions at 180 degree operation of the said cams, a cam shaft upon which the said record selector plunger operating cam and the said tone arm placing cam are mounted, means for rotating said cam shaft, cam means adapted to normally render the said cam shaft rotating means inoperative and to permit 180 degree rotation thereof upon each release thereof, and means for releasing said last mentioned cam means to permit 180 degree rotation of the cam shaft first responsive to the positioning of the record selector plunger in operating relationship with respect to any record holder tilting means and second responsive to the completion of the playing of any record.

47. In an automatic phonograph, the combination of a record magazine comprising a plurality of record holders pivotally mounted for movement normal to the axis of rotation of records held therein and including means for tilting the same independently of each other from their neutral position into one of two playing positions, means for yieldably maintaining each record holder in its neutral position, a selector plunger, means responsive to manual pre-selection for positioning said selector plunger in operating relationship with respect to a record holder tilting means, a record selector plunger operating cam adapted through intermediate means to tilt any selected record holder into either playing position, means in each record holder for rotatably supporting a record on its peripheral edge, means for rotating a record carried by any record holder when tilted into either playing position, a pair of tone arms including a tone pick-up thereon each mounted for movement parallel to the axis of rotation of records held in said record holder and adapted to be moved from their neutral position into juxtaposition with one side or the other of a record carried by any record holder responsive to the tilting of the record holder into one or the other of the said two playing positions, the said tone arms being pivoted to follow the spiral sound groove of a record when the tone pick-up thereof is placed thereagainst, means for yieldably maintaining the said tone arms in their neutral position, a tone arm placing cam adapted through intermediate means to place the tone pick-up of the tone arm juxtaposed to the rotating record into playing contact thereagainst, each of the said cams having a dwell to permit the holding of the said record selector plunger and tone arms to rest in their operated positions at 180 degree operation of the said cams, a cam shaft upon which the said record selector plunger operating cam and the said tone arm placing cam are mounted, means for rotating said cam shaft, cam means adapted to normally render the said cam shaft rotating means inoperative and to permit 180 degree rotation thereof upon each release thereof, means for releasing said last mentioned cam means to permit 180 degree rotation of the cam shaft first responsive to the positioning of the record selector plunger in operating relationship with respect to any record holder tilting means and second responsive to the completion of the playing of any record, and means for actuating the said means for releasing the said last mentioned cam means responsive to manual operation optional during the playing of any record.

48. In an automatic phonograph, the combination of a record magazine comprising a plurality of record holders pivotally mounted for movement normal to the axis of rotation of records held therein and including means for tilting the same independently of each other from their neutral position into one of two playing positions, means for yieldably maintaining each record holder in its neutral position, a selector plunger, means responsive to manual pre-selection for positioning said selector plunger in operating relationship with respect to a record holder tilting means, a record selector plunger operating cam adapted through intermediate means to tilt any selected record holder into either playing position, means in each record holder for rotatably supporting a record on its peripheral edge, means for rotating a record carried by any record holder when tilted into either playing position, means for regulating the speed of the said record rotating means, a pair of tone arms including a tone pick-up thereon each mounted for movement parallel to the axis of rotation of records held in said record holder and adapted to be moved from their neutral position into juxtaposition with one side or the other of a record carried by any record holder responsive to the tilting of the record holder into one or the other of the said two playing positions, the said tone arms being pivoted to follow the spiral sound groove of a record when the tone pick-up thereof is placed thereagainst, means for yieldably maintaining the said tone arms in their neutral position, a tone arm placing cam adapted through intermediate means to place the tone pick-up of the tone arm juxtaposed to the rotating record into playing contact thereagainst, and means for rotating said cams first to tilt the selected record holder and place said tone arm automatically in response to manual pre-selection and second to release said tone arm and record holder in response to the completion of playing of a selection.

49. In an automatic phonograph, the combination of a record magazine comprising a plurality of record holders pivotally mounted for movement normal to the axis of rotation of records held therein and including means for tilting the same independently of each other from their neutral position into one of two playing positions, means for yieldably maintaining each record holder in its neutral position, a selector plunger, means responsive to manual pre-selection for positioning said selector plunger in operating relationship with respect to a record holder tilting means, a record selector plunger operating cam adapted through intermediate means to tilt any selected record holder into either playing position, means in each record holder for rotatably supporting a record on its peripheral edge, means for rotating a record carried by any record holder when tilted into either playing position, a pair of tone arms including a tone pick-up thereon each mounted for movement parallel to the axis of rotation of records held in said record holder and adapted to be moved from their neutral position into juxtaposition with one side or the other of a record carried by any record holder responsive to the tilting of the record holder into one or the other of the said two playing positions, the said tone arms being pivoted to follow the spiral sound groove of a record when the tone pick-up thereof is placed thereagainst, means for yieldably maintaining the said tone arms in their neutral position, a tone arm placing cam adapted through intermediate means to place the tone pick-up of the tone arm juxtaposed to the rotating record into playing contact thereagainst, each of the said cams having a dwell to permit the holding of the said record plunger and tone arms to rest in their operated positions at 180 degree rotation of the said cams, a cam shaft upon which the said record selector plunger operating cam and the said tone arm placing cam are mounted, means for rotating the cam shaft, cam means adapted to normally render the said cam shaft rotating means inoperative, a solenoid adapted to release the said last mentioned cam means and permit 180 degree rotation thereof upon each actuation of the said solenoid, contact means on said selector plunger adapted to actuate the said solenoid upon the positioning of the record selector plunger in operating relationship with respect to any record holder tilting means, and contact means on each tone arm adapted to actuate the said solenoid upon the completion of the playing of any record.

50. In an automatic phonograph, the combination of a record magazine comprising a plurality of record holders pivotally mounted for movement normal to the axis of rotation of records held therein and including means for tilting the same independently of each other from their neutral position into one of two playing positions, means for yieldably maintaining each record holder in its neutral position, a selector plunger, means responsive to manual pre-selection for positioning said selector plunger in operating relationship with respect to a record holder tilting means, a record selector plunger operating cam adapted through intermediate means to tilt any selected record holder into either playing position, means in each record holder for rotatably supporting a record on its peripheral edge, means for rotating a record carried by any record holder when tilted into either playing position, a pair of tone arms including a tone pick-up thereon each mounted for movement parallel to the axis of rotation of records held in said record holder and adapted to be moved from their neutral position into juxtaposition with one side or the other of a record carried by any record holder responsive to the tilting of the record holder into one or the other of the said two playing positions, the said tone arms being pivoted to follow the spiral sound groove of a record when the tone pick-up thereof is placed thereagainst, means for yieldably maintaining the said tone arms in their neutral position, a tone arm placing cam adapted through intermediate means to place the tone pick-up of the tone arm juxtaposed to the rotating record into playing contact thereagainst, each of the said cams having a dwell to permit the holding of the said record plunger and tone arms to rest in their operated positions at 180 degree rotation of the said cams, a cam shaft upon which the said record selector plunger operating cam and the said tone arm placing cam are mounted, means for rotating the cam shaft, cam means adapted to normally render the said cam shaft rotating means inoperative, a solenoid adapted to release the said last mentioned cam means and permit 180 degree rotation thereof upon each actuation of the said solenoid, contact means on said selector plunger adapted to actuate the said solenoid upon the positioning of the record selector plunger in operating relationship with respect to any record holder tilting means, contact means on each tone arm adapted to actuate the said solenoid upon the completion of the playing of any record, and contact means adapted to actuate the said solenoid responsive to manual operation optional during the playing of any record.

51. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrumed at different points with respect to the means employed for actuating the same whereby to permit each tilting lever of a pair of tilting levers to tilt the record holder linked thereto into one of its two playing positions, a link pivotally connecting each record holder to its pair of tilting levers, one or more selector plungers, continuously traveling means carrying said selector plungers one at a time past said record holder tilting levers, a stop means for each record holder tilting lever adapted to be placed responsive to manual pre-selection into the path of the said traveling selector plungers whereby to arrest the travel thereof and position a selector plunger in operative alignment with the corresponding record holder tilting lever, a special stop means adapted to be manually placed in the path of travel of the said selector plungers during the selecting of a program and arrest the said traveling selector plungers out of registry with respect to any of the said stop means, means responsive to cam means for actuating said selector plunger when arrested in operative alignment with a tilting lever whereby to tilt the corresponding record holder into the selected playing position, spring means in the housing of the said selector plunger adapted to return the same to its normal position after being actuated, and means on each stop means adapted to be engaged by a selector plunger during its return to its normal position whereby to return the stop means to its normal position.

52. In an automatic phonograph, the combination of a record magazine comprising a plurality of record holders pivotally mounted for movement normal to the axis of rotation of records held therein and adapted to be tilted independently of each other into one of two playing positions from a neutral position, means for yieldably maintaining each record holder in its neutral position, a pair of tilting levers for each record holder fulcrumed at different points with respect to the means employed for actuating the same whereby to permit each tilting lever of a pair of tilting levers to tilt the record holder linked thereto into one of its two playing positions, a link pivotally connecting each record holder to its pair of tilting levers, one or more selector plungers, continuously traveling means carrying said selector plungers one at a time past said record holder tilting levers, a stop means for each record holder tilting lever adapted to be placed responsive to manual pre-selection into the path of the said traveling selector plungers whereby to arrest the travel thereof and position a selector plunger in operative alignment with the corresponding record holder tilting lever, a special stop means adapted to be manually placed in the path of travel of the said selector plungers during the selecting of a program and arrest the said traveling selector plungers out of registry with respect to any of the said stop means, means responsive to cam means for actuating said selector plunger when arrested in operative alignment with a tilting lever whereby to tilt the corresponding record holder into the selected playing position, spring means in the housing of the said selector plunger adapted to return the same to its normal position after being actuated, means on each stop means adapted to be engaged by a selector plunger during its return to its normal position whereby to return the stop means to its normal position, and a pin on each selector plunger adapted to become aligned with any stop means except the said special stop means that arrests the travel of any selector plunger whereby to prevent the manual returning of any stop to its normal position except the said special stop while a selector plunger is arrested in alignment with a record holder tilting lever.

53. In an automatic phonograph, the combination of a record magazine comprising a plurality of record holders, a pair of record supporting means journaled in each record holder on which a record placed on its peripheral edge in a record holder may rotate, means for mounting each record holder movable independent of the others into one of two playing positions, means adapted to engage the peripheral edge of a record positioned in any record holder and rotate the record when the said record holder is moved into either playing position, and means responsive to manual pre-selection for moving a plurality of records sequentially into either playing position.

WALTER F. SCHULZ.